(12) United States Patent
Srinivasan et al.

(10) Patent No.: US 10,839,378 B1
(45) Date of Patent: Nov. 17, 2020

(54) SYSTEMS AND METHODS FOR PERFORMING DEVICE AUTHENTICATION OPERATIONS USING CRYPTOCURRENCY TRANSACTIONS

(71) Applicant: 21, Inc., San Francisco, CA (US)

(72) Inventors: Balaji S. Srinivasan, Menlo Park, CA (US); Daniel Firu, San Jose, CA (US); Veerbhan Kheterpal, Santa Clara, CA (US); Nigel Drego, San Francisco, CA (US)

(73) Assignee: 21, Inc., San Francisco, CA (US)

(*) Notice: Subject to any disclaimer, the term of this patent is extended or adjusted under 35 U.S.C. 154(b) by 849 days.

(21) Appl. No.: 14/993,999

(22) Filed: Jan. 12, 2016

(51) Int. Cl.
*G06Q 20/36* (2012.01)
*G06Q 20/06* (2012.01)
*G06Q 20/40* (2012.01)

(52) U.S. Cl.
CPC ....... *G06Q 20/3674* (2013.01); *G06Q 20/065* (2013.01); *G06Q 20/401* (2013.01)

(58) Field of Classification Search
None
See application file for complete search history.

(56) References Cited

U.S. PATENT DOCUMENTS

| | | | | |
|---|---|---|---|---|
| 5,396,558 A * | 3/1995 | Ishiguro | ............... | G06Q 20/341 380/30 |
| 7,636,679 B2 * | 12/2009 | Song | ............. | G06Q 20/04 705/35 |
| 8,666,893 B1 * | 3/2014 | Jones | ............. | G06Q 40/02 705/44 |
| 8,727,893 B2 * | 5/2014 | Lee | ............. | A63F 13/332 463/42 |

(Continued)

FOREIGN PATENT DOCUMENTS

| CA | 2809352 | 9/2014 |
|---|---|---|
| WO | 2014040717 | 3/2014 |

OTHER PUBLICATIONS

Christidis et al (Blockchains and Smart Contracts for the Internet of Things) (Year: 2016).*

(Continued)

*Primary Examiner* — Mamon Obeid
(74) *Attorney, Agent, or Firm* — Jeffrey Schox; Diana Lin

(57) ABSTRACT

A first device may be coupled to a second device over a network. The first device may maintain a first cryptocurrency wallet and may include mining circuitry that generates cryptocurrency rewards for the wallet. The first device may transmit a communications request to the second device. The second device may transmit payment information identifying a second wallet and a selected authentication amount to the first device. The second device may select the authentication amount to perform a desired amount of device connection rate limiting. The first device may generate an authentication transaction for a cryptocurrency network to transfer the authentication amount from the first wallet to the second wallet. The second device may determine whether the authentication transaction has been verified by the cryptocurrency network. In response to determining that the authentication transaction has been verified by the cryptocurrency network, the second device may establish the communication link.

11 Claims, 17 Drawing Sheets

(56) References Cited

U.S. PATENT DOCUMENTS

| | | | | |
|---|---|---|---|---|
| 8,885,931 | B2* | 11/2014 | Srivastava | G06K 9/6255 382/161 |
| 9,135,787 | B1* | 9/2015 | Russell | G07F 19/201 |
| 9,148,283 | B1* | 9/2015 | Shankar | H04L 9/0819 |
| 9,892,460 | B1* | 2/2018 | Winklevoss | G06Q 40/04 |
| 10,194,320 | B1* | 1/2019 | Egner | H04W 12/08 |
| 10,291,619 | B2* | 5/2019 | Odom | G06F 21/10 |
| 2001/0002485 | A1* | 5/2001 | Bisbee | G07F 7/12 713/167 |
| 2001/0039535 | A1* | 11/2001 | Tsiounis | G06Q 20/4012 705/71 |
| 2001/0056410 | A1* | 12/2001 | Ishigaki | G06Q 20/12 705/67 |
| 2002/0152178 | A1* | 10/2002 | Lee | G06Q 20/32 705/67 |
| 2006/0052168 | A1* | 3/2006 | Shacham | G07F 17/3223 463/42 |
| 2006/0155644 | A1* | 7/2006 | Reid | G06Q 20/04 705/42 |
| 2006/0191021 | A1* | 8/2006 | Jeong | H04N 21/6334 726/29 |
| 2006/0293989 | A1* | 12/2006 | Morrison | G06Q 40/02 705/35 |
| 2007/0288392 | A1* | 12/2007 | Peng | G06Q 20/322 705/72 |
| 2008/0155019 | A1* | 6/2008 | Wallace | A63F 13/71 709/204 |
| 2008/0243650 | A1* | 10/2008 | Yoon | H04M 15/68 705/30 |
| 2009/0050689 | A1* | 2/2009 | Sako | G06Q 20/3278 235/375 |
| 2009/0234764 | A1* | 9/2009 | Friesen | G06Q 10/10 705/35 |
| 2009/0249061 | A1* | 10/2009 | Hamilton, II | H04L 9/3263 713/156 |
| 2009/0292927 | A1* | 11/2009 | Wenzel | G06F 21/41 713/185 |
| 2010/0100482 | A1* | 4/2010 | Hardt | G06Q 20/10 705/44 |
| 2010/0153274 | A1* | 6/2010 | Jakobsson | G06Q 20/3829 705/71 |
| 2010/0153275 | A1* | 6/2010 | Jakobsson | G06Q 20/3829 705/71 |
| 2011/0320355 | A1* | 12/2011 | Pasha | G06Q 20/40 705/44 |
| 2012/0030736 | A1* | 2/2012 | Resch | G06F 3/0619 726/5 |
| 2012/0066131 | A1* | 3/2012 | Modi | G06Q 20/0855 705/44 |
| 2012/0185386 | A1* | 7/2012 | Salama | G06Q 20/108 705/42 |
| 2013/0073388 | A1* | 3/2013 | Heath | G06Q 30/02 705/14.53 |
| 2013/0073389 | A1* | 3/2013 | Heath | G06Q 50/01 705/14.54 |
| 2013/0117400 | A1* | 5/2013 | An | H04L 51/04 709/206 |
| 2013/0282580 | A1* | 10/2013 | O'Brien | G06Q 20/4014 705/44 |
| 2013/0346309 | A1* | 12/2013 | Giori | G06Q 20/10 705/43 |
| 2014/0006129 | A1* | 1/2014 | Heath | G06Q 30/0222 705/14.23 |
| 2014/0052697 | A1* | 2/2014 | Williams | G06K 9/186 707/691 |
| 2014/0095383 | A1* | 4/2014 | Rao | G06Q 20/385 705/43 |
| 2014/0164251 | A1* | 6/2014 | Loh | G06Q 20/065 705/67 |
| 2014/0165170 | A1* | 6/2014 | Dmitriev | H04L 63/18 726/7 |
| 2014/0258110 | A1* | 9/2014 | Davis | G06Q 30/0611 705/41 |
| 2014/0258121 | A1* | 9/2014 | Raman | G06Q 20/322 705/44 |
| 2014/0279542 | A1* | 9/2014 | Baird | G06Q 20/40 705/44 |
| 2014/0316984 | A1* | 10/2014 | Schwartz | G06Q 20/40145 705/44 |
| 2015/0033301 | A1* | 1/2015 | Pianese | H04L 63/10 726/5 |
| 2015/0106882 | A1* | 4/2015 | Li | H04L 63/0823 726/4 |
| 2015/0237496 | A1* | 8/2015 | Gao | H04W 12/0023 455/414.1 |
| 2015/0356524 | A1* | 12/2015 | Pennanen | G06Q 20/4012 705/71 |
| 2015/0356555 | A1* | 12/2015 | Pennanen | G06Q 20/382 705/71 |
| 2016/0328549 | A1* | 11/2016 | Cui | G06F 21/35 |
| 2016/0342977 | A1* | 11/2016 | Lam | G06Q 20/0658 |
| 2017/0111175 | A1* | 4/2017 | Oberhauser | H04L 63/08 |
| 2017/0132615 | A1* | 5/2017 | Castinado | G06F 16/2255 |
| 2017/0132630 | A1* | 5/2017 | Castinado | G06Q 20/382 |
| 2017/0214675 | A1* | 7/2017 | Johnsrud | H04L 9/3236 |
| 2017/0232300 | A1* | 8/2017 | Tran | H04L 69/40 434/247 |
| 2017/0323392 | A1* | 11/2017 | Kasper | H04L 63/123 |
| 2017/0338963 | A1* | 11/2017 | Berg | H04L 9/14 |
| 2017/0351852 | A1* | 12/2017 | Bao | H04W 4/029 |
| 2017/0359408 | A1* | 12/2017 | Kurian | G06Q 10/06 |
| 2018/0005318 | A1* | 1/2018 | Pierce | G06Q 40/04 |
| 2018/0048641 | A1* | 2/2018 | Zheng | H04L 63/0846 |
| 2018/0075536 | A1* | 3/2018 | Jayaram | G06Q 20/405 |
| 2018/0078843 | A1* | 3/2018 | Tran | A61B 5/6803 |
| 2018/0101844 | A1* | 4/2018 | Song | H04L 9/3265 |
| 2018/0109541 | A1* | 4/2018 | Gleichauf | H04W 12/10 |
| 2018/0204216 | A1* | 7/2018 | Jayaram | G06Q 20/405 |
| 2018/0330342 | A1* | 11/2018 | Prakash | G06Q 20/4014 |
| 2018/0374090 | A1* | 12/2018 | Hammad | G06Q 20/3674 |
| 2019/0005470 | A1* | 1/2019 | Uhr | H04L 9/3239 |
| 2019/0295049 | A1* | 9/2019 | Karame | H04L 9/30 |

OTHER PUBLICATIONS

Tucket et al., "Interactive Demonstration: This Is How You Mine Some Bitcoin," Bloomberg Businessweek, Jan. 13, 2014 [Retrieved on Apr. 14, 2014]. Retrieved from the Internet <URL: http://http://www.businessweek.com/printer/articles/185845-interactive-demonstration-this-is-how-you-mine-some-bitcoin>.

Berke et al., "Bitcoin Demystified: A Hacker's Perspective," HuffPost Code, Nov. 25, 2013 [Retrieved on Apr. 14, 2014]. Retrieved from the Internet <URL:http://www.huffingtonpost.com/2013/11/25/bitcoin-basics-explained-_n_4340141.html?view=print&comm_ref=false>.

"Mining," Bitcoin Wiki, Apr. 1, 2014 [Retrieved on Apr. 14, 2014]. Retrieved from the Internet <URL:https://en.bitcoin.it/wiki/Mining>.

"Block," Bitcoin Wiki, Mar. 2, 2014 [Retrieved on Apr. 14, 2014]. Retrieved from the Internet <URL:https://en.bitcoin.it/wiki/Block>.

Nakamoto, Bitcoin: A Peer-to-Peer Electronic Cash System, Oct. 31, 2008, XP055131503, Retrieved from the Internet: <URL:http:IIbitcon.org/bitcon.pdf> [retreived on Jul. 24, 2014].

Barber et al., : Bitter to Better How to Make Bitcoin a Better Currency, Mar. 2, 2012, Financial Cryptography and Data Security, Sprincer Berlin Heildelberg, berlin, Heidelberg, pp. 399-414, XP047013846 ISBN: 978-3-642-32945-6.

"Mining Pool Reward FAQ—Bitcoin Wiki", Jun. 27, 2011, XP055197824, Retrieved from the Internet: <URL:http://en.bitcoin.it/wiki/Mining_poolreward_FAQ> [retrieved on Jun. 23, 2015].

Luu et al., "On Power Splitting Games in Distributed Computation: The Case of Bitcoin Pooled Mining", International Association for Cryptologic Research, vol. 20150227:213542, Feb. 24, 2015, pp. 1-18, XP061018051, [retreived on Feb. 24, 2015].

Hurlburt et al.,"Botcoin: Benefit or Curse?" IT Professionals, IEEE Service Center, Los Alamitos, CA, US, vol. 16, No. 3, May 1, 2014,

(56) References Cited

OTHER PUBLICATIONS pp. 10-15, XP011551680, ISSN: 1502-9202, DOI: 10.1109/MITP.2014.28 [retrieved on Jun. 17, 2014].
Pauker et al., U.S. Appl. No. 14/252,613, filed Apr. 14, 2014.
Srinivasan, "A bitcoin miner in every device and in every hand", May 18, 2015, [Retrieved on Jun. 10, 2015], Retrieved from the Internet: <URL:https://medium.com/@21dotco/a-bitcoin-miner-in-every-device-and-in-every-hand-e315b40f2821#.snr21uqrc>.
Srinivasan et al., U.S. Appl. No. 14/920,524, filed Oct. 22, 2015.

* cited by examiner

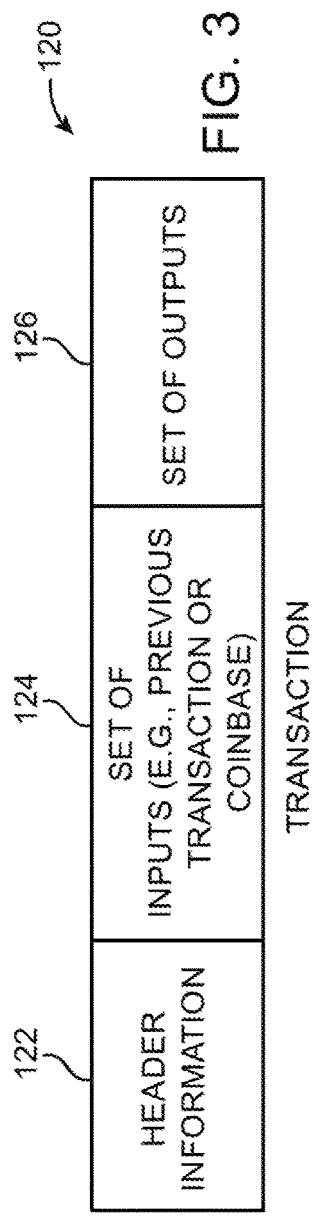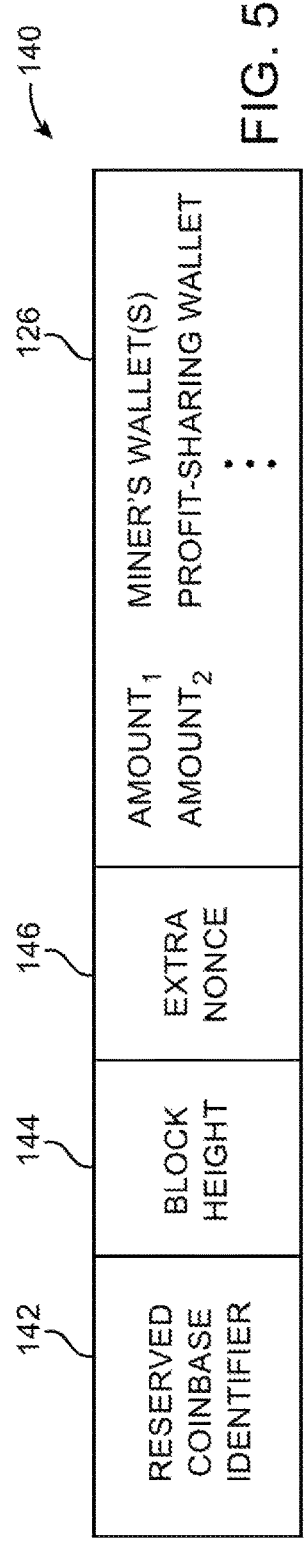
FIG. 3
FIG. 4
FIG. 5

SYSTEMS AND METHODS FOR PERFORMING DEVICE AUTHENTICATION OPERATIONS USING CRYPTOCURRENCY TRANSACTIONS

BACKGROUND

This relates to electronic devices and, more particularly, to electronic devices that perform device authentication operations with the aid of digital cryptocurrency.

Electronic devices include processors that use power to run one or more applications. Applications on electronic devices include software applications such as image processing applications, networking applications, and other applications. A typical electronic device includes communications circuitry for interfacing with an external computing node over a communications link. The electronic device often broadcasts data to the external computing node after the communications link has been established.

In order to establish the communications link between the electronic device and the external computing node, the electronic device transmits a request to establish the communications link. It may be desirable for the external computing node to authenticate the identity of the electronic device that is requesting communications prior to establishment of the communications link. Authenticating the identity of the electronic device can prevent unauthorized devices from establishing communications with the external computing node. If care is not taken, unauthorized devices can gain access to sensitive data stored on the external computing node and the external computing node can be susceptible to a burdensome number of communications requests from unauthorized devices.

SUMMARY OF THE INVENTION

A first electronic device may be coupled to a second electronic device over a communications network. The first electronic device may maintain information identifying a cryptocurrency wallet. If desired, the first electronic device may include cryptocurrency mining circuitry. The cryptocurrency mining circuitry may generate cryptocurrency rewards for the cryptocurrency wallet by completing a function according to a cryptocurrency protocol maintained by a cryptocurrency network. For example, the mining circuitry may generate bitcoin rewards for the cryptocurrency wallet according to the Bitcoin protocol.

The first electronic device may transmit a request to establish a communications link (e.g., a request to broadcast data) to the second electronic device. The first electronic device may perform device authentication operations to verify the identity of the first electronic device for the second electronic device (e.g., using the maintained cryptocurrency wallet information). For example, the second electronic device may transmit a challenge message to the first electronic device. The first electronic device may transmit the maintained cryptocurrency wallet information to the second electronic device in response to the challenge. The second electronic device may compare the cryptocurrency wallet information to predetermined wallet information to verify the identity of the first electronic device. Once the identity of the first electronic device has been verified, the communications link between the first and second devices may be established. For example, the second device may allow data to be broadcasted by the first device and may store the broadcasted data after the identity has been verified.

If desired, the second electronic device may transmit payment information to the first electronic device in response to the request for communication. The payment information may include information identifying an additional cryptocurrency wallet and a selected authentication amount of cryptocurrency. The second electronic device may select the authentication amount to perform a desired amount of device connection rate limiting (e.g., to perform a desired amount of device connection filtering). The first electronic device may generate an authentication cryptocurrency transaction based on the payment information to transfer the authentication amount of cryptocurrency from the cryptocurrency wallet to the additional cryptocurrency wallet. The second electronic device may determine whether the authentication transaction has been verified by the cryptocurrency network. In response to determining that the authentication transaction has been verified by the cryptocurrency network, the second electronic device may establish the communication link with the first electronic device (e.g., the second device may store data broadcasted by the first device). In response to determining that the authentication transaction has not been verified by the cryptocurrency network, the second electronic device may block communications from the first device.

Further features will be more apparent from the accompanying drawings and the following detailed description.

BRIEF DESCRIPTION OF THE DRAWINGS

FIG. 3 is an illustrative transaction of digital currency that may be verified with mining circuitry in accordance with an embodiment.

FIG. 4 is an illustrative transaction of digital currency between digital source and destination wallets that may be verified using cryptographic hashing circuitry in accordance with an embodiment.

FIG. 5 is an illustrative coinbase transaction in which a portion of a reward amount is assigned to one or more different wallets in accordance with an embodiment.

DETAILED DESCRIPTION

Figure 1:
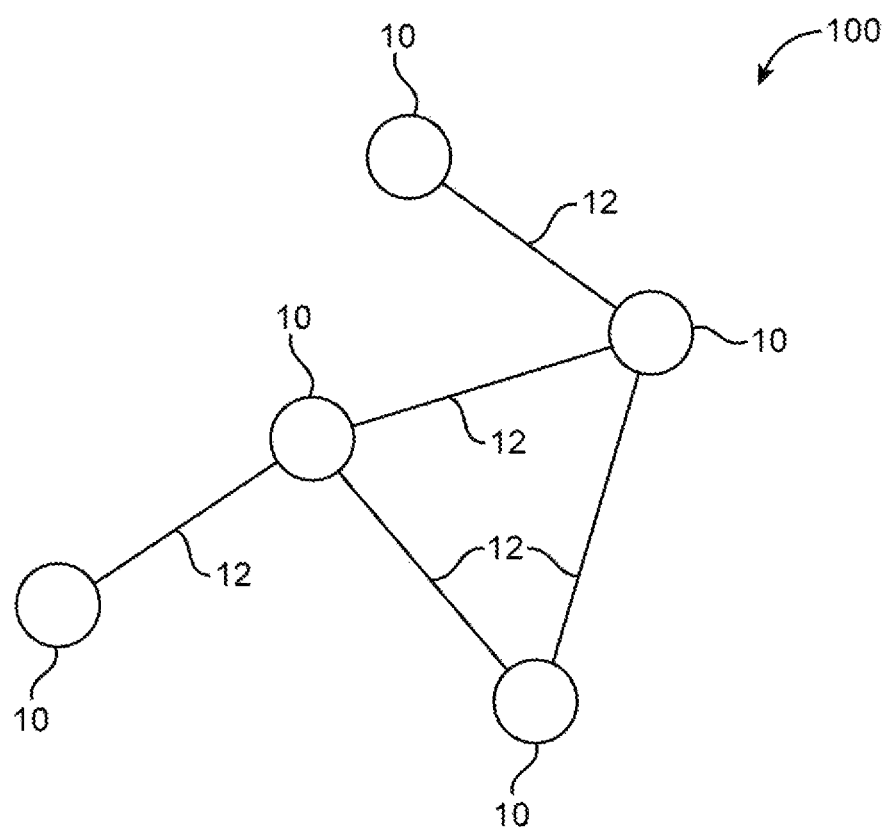
FIG. 1 is an illustrative diagram of a network of nodes having cryptographic hashing circuitry that may be used to mine digital currency in accordance with an embodiment.

Digital currencies serve as a digital medium of exchange in which the digital currencies may be transferred in exchange for goods and services. Crypto-currencies are examples of digital currencies in which cryptography governs the creation and exchange of value. An example of a crypto-currency is the bitcoin cryptocurrency that is governed by the Bitcoin protocol. This is in contrast to traditional mediums of exchange that are governed, for example, by a central authority.

The Bitcoin protocol defines a system in which the creation and distribution of the bitcoin cryptocurrency is governed by consensus among a peer-to-peer network. The network maintains a public ledger in which new transactions are verified and recorded by members of the network via cryptography. The operations of verifying and recording transactions of cryptocurrencies such as transactions in the bitcoin cryptocurrency are sometimes referred to as mining, because completion of each mining operation typically rewards the miner with newly created cryptocurrency (e.g., bitcoins). Verified transactions and newly created bitcoins are recorded in the public ledger. The public ledger serves as an official history of transactions. The amount of cryptocurrency owned by any entity may be determined from the public ledger.

Bitcoin mining operations involve identifying a solution to a cryptographic puzzle in which transactions that are to be verified form part of the puzzle parameters. Bitcoin mining operations are typically performed via brute-force techniques (e.g., an exhaustive search for a puzzle solution performed across all possible solutions). Searching for solutions to the cryptographic puzzle involve performing cryptographic hashing functions and other cryptographic operations that are often computationally taxing. The difficulty of the cryptographic puzzle has led to the use of dedicated circuitry designed specifically for Bitcoin mining. If desired, such dedicated circuitry may be embedded within the hardware of other electronic devices that are used to perform other functions for a corresponding user that are not directly related to Bitcoin mining.

The present invention relates to electronic devices having device authentication capabilities, and, more particularly, to electronic devices having embedded cryptographic hashing circuitry for mining cryptocurrencies such as Bitcoin that are used to authenticate communications with external devices. Mining circuitry and mining operations described herein may be used for any digital medium of exchange such as digital currencies, credits, rewards, or points.

While the example of using circuitry to perform cryptographic operations for mining cryptocurrencies is sometimes described herein as an example, in general, the systems and methods described herein may be applied to any desired system for performing cryptographic operations such as cryptographic hashing operations (e.g., for encrypting or decrypting sensitive data, for protecting communications prior to data transmission of an unsecure medium, for obscuring or scrambling sensitive data, etc.).

In the example where cryptographic operations are performed for maintaining or mining a digital cryptocurrency, a network of peers (nodes) may be provided that maintain and/or mine the digital crypto-currency according to a crypto-currency protocol such as the Bitcoin protocol. FIG. 1 is an illustrative diagram of a peer-to-peer network 100 that may operate according to the Bitcoin protocol. Network 100 includes nodes 10 that are coupled to other nodes via paths 12. Nodes 10 may be electronic devices such as desktop computers, laptop computers, cellular telephones, servers, or other electronic devices that implement the Bitcoin protocol. Each node 10 may communicate with other nodes of network 100 over paths 12. Paths 12 may, for example, include network paths such as network cables and packet forwarding devices (e.g., switches, routers, etc.) that couple nodes 10 to other nodes. This example is merely illustrative. Nodes 10 of network 100 may be coupled via any desired underlying communications technology such as wired or wireless network technologies and network 100 may include any desired number of nodes (e.g., tens, hundreds, thousands, millions, or more).

Nodes 10 may communicate over paths 12 according to the Bitcoin protocol in maintaining the cryptocurrency. For example, nodes 10 may communicate to maintain a global ledger of all official transactions. Each node 10 may store a copy of the global ledger (e.g., a complete copy or only a partial copy). Transactions added to the global ledger by each node 10 may be verified by other nodes 10 to help ensure validity of the ledger.

Figure 2:
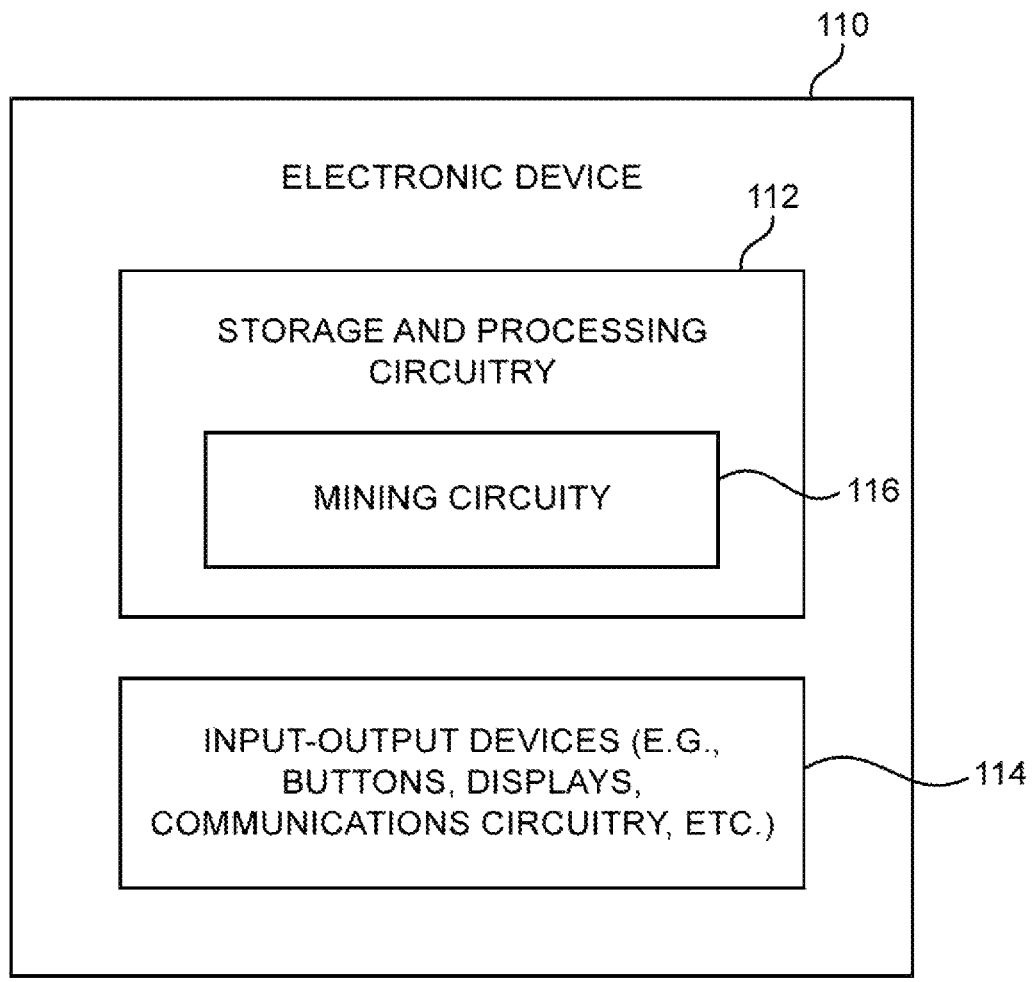
FIG. 2 is an illustrative diagram of an electronic device that may include cryptographic hashing circuitry in accordance with an embodiment.

FIG. 2 is an illustrative diagram of an electronic device 110 that may serve as a node in a peer-to-peer network (e.g., as a node 10 of FIG. 1). As shown in FIG. 2, device 110 may include storage and processing circuitry 112. Storage and processing circuitry 112 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 112 may be used to control the operation of device 110. This processing circuitry may be based on one or more general purpose processing circuits such as microprocessors, microcontrollers, and digital signal processors, or dedicated processing circuits such as application specific integrated circuits, etc.

Device 110 may be provided with input-output devices 114 such as buttons, speakers, microphones, displays, and other input-output devices that accommodate user interaction with device 110. Input-output devices 114 may include communications circuitry for communicating with other devices (e.g., other nodes of a cryptocurrency network). Mining circuitry 116 may perform mining operations such as verifying cryptocurrency transactions (e.g., while sharing any rewards or the mining operations between multiple entities such as a user of the device). Mining circuitry 116 may record the rewards in the global ledger. Mining circuitry 116 may, for example, be an integrated circuit chip. Electronic device 110 may include one or more of these chips that may be operated together or independently.

Electronic device 110 may be a desktop computer, a server in a rack-based system, a portable electronic device such as a tablet computer, laptop computer, or a cellular telephone. These examples are merely illustrative. Mining circuitry 116 may be provided to any desired electronic device that can communicate with other nodes of a cryptocurrency network. For example, a flash drive that connects with a computer may be provided with mining circuitry 116. In this scenario, the mining circuitry 116 may operate to perform mining operations by utilizing computer resources when the flash drive is connected to a computer (e.g., by utilizing power from the computer and a network connection between the computer and nodes of a cryptocurrency network).

FIG. 3 is a diagram of an illustrative cryptocurrency transaction 120 that may be verified using mining circuitry such as circuitry 116 of FIG. 2. As shown in FIG. 3, transaction 120 may include header information 122, a set of one or more inputs 124, and a set of one or more outputs 126.

Header information 122 may include one or more header fields including information that helps to identify the transaction. For example, the header fields may include a version number identifying the version of the Bitcoin protocol that is used. As another example, the header fields may include a current timestamp and/or other information on the transaction.

Digital currency may be stored in digital wallets that serve as sources or destinations of transactions. For example, a transaction may transfer funds from a source wallet to a destination wallet. Digital wallets may be formed using any desired data structure and may sometimes be referred to as digital accounts. Wallets may be identified using encryption schemes such as public-key cryptography in which a public-private key pair is assigned to each wallet. The public key of a wallet may serve to publicly identify the wallet (e.g., a public address to which funds may be directed), whereas the private key may be used by the owner of the wallet to sign transactions (e.g., thereby verifying the authenticity of the transactions).

Transaction 120 may identify an input 124 (e.g., a source of funds) and a set of outputs 126 (e.g., destinations). The inputs and outputs may, for example, be digital wallets in which currency is stored. The inputs may refer to an output of a previous transaction as a source of funding or may identify that transaction 120 is an originating transaction that creates new currency (sometimes referred to as a coinbase transaction).

FIG. 4 is a diagram of an illustrative transaction 130 that transfers currency from a source wallet to a destination wallet. Transaction 130 may be, for example, a data packet or sequence (stream) of data packets having corresponding header fields 124 and 126. As shown in FIG. 4, input 124 may include a previous transaction identifier, an output identifier, and a signature. If desired, header information 122 of FIG. 3 such as version number or timestamp information may be included in the transaction of FIG. 5.

The previous transaction identifier may identify which transaction of the global ledger contains the source wallet. The previous transaction identifier may, if desired, identify the previous transaction TXPREV by a hash (e.g., H(TXPREV)) or double-hash (e.g., H(H(TXPREV)) or DH(TXPREV)) of the previous transaction. The output identifier may identify which output of the identified previous transaction serves as the source wallet of transaction 130. For example, the outputs 126 of the previous transaction may be enumerated and the index of the source wallet may serve as the output identifier.

Transaction 130 may be signed to help ensure authenticity of the transaction. For example, the private key of the source wallet may be used to encrypt transaction 130 or a portion of transaction 130 to generate the signature that is stored in transaction 130. The public key of the source wallet may be used by others (e.g., other network nodes) to decrypt the signature and confirm the authenticity of the transaction.

The set of outputs 126 identifies one or more destination wallets and a respective amount to transfer from the source wallet to each destination wallet. In the example of FIG. 4, the transaction includes one destination wallet and a corresponding amount to be transferred from the source wallet to the destination wallet. Multiple destination wallets (e.g., two, three, four, or more) may be listed along with corresponding amounts to be transferred to each destination wallet from the source wallet. If desired, the source wallet identified by input 124 may also be listed as a destination wallet. For example, the amount to be transferred to the destination wallet may be less than the amount identified by the output of the previous transaction as belonging to the source wallet. In this scenario, the difference between the amount of the source wallet and the transfer amount may be assigned to the source wallet as an additional output entry. If desired, the amount assigned in outputs 126 to the source wallet may be less than the difference between the originally stored amount and the transfer amount. In this scenario, the difference between original source amount and the sum of amounts in output 126 may serve as additional reward for any miner that verifies the transaction (e.g., in addition to any predetermined reward defined by the cryptocurrency protocol).

FIG. 5 is an illustrative diagram of an originating transaction (i.e., coinbase transaction) that may generate new digital currency. As shown in FIG. 5, transaction 140 includes information that identifies the transaction as a coinbase transaction. The information may include a reserved coinbase identifier 142, a block height 144, and an extra-nonce value 146. If desired, header information 122 of FIG. 3 such as version number or timestamp information may be included in the transaction of FIG. 5.

Reserved coinbase identifier 142 may be a value that is reserved for coinbase transactions. Block height 144 may help identify where the coinbase transaction is located within the global ledger (e.g., which block of a block chain that represents the global ledger). Extra-nonce value 146 is an arbitrary value that may be modified during mining operations.

In contrast to normal transactions such as transaction 130 of FIG. 4, coinbase transaction 140 does not provide a source of funds for outputs 126. Instead, coinbase transaction 140 may create new currency. The amount of new currency created is determined by the cryptocurrency protocol. For example, nodes of the cryptocurrency network may communicate and establish an agreed-upon reward that is created for verifying transactions. The agreed-upon reward may be determined based on the size of the global ledger (e.g., how many recorded blocks are in the global ledger). As an example, the reward for verifying and recording transactions in the Bitcoin protocol may reward a number of bitcoins (units of currency) such as 25 bitcoins. This example is merely illustrative, as the number of bitcoins rewarded may be less than 25 (e.g., 12.5, 6.25, etc.) or may even be zero.

In some scenarios, transactions that are verified using mining circuitry may include fees. For example, transaction 130 of FIG. 4 may assign fewer bitcoins to destination wallets than contained in the source wallet. In this scenario, the remainder may serve as fees (e.g., an additional reward) for a miner. This additional reward may be assigned to the miner's wallet in coinbase transaction 140 or may also be partitioned by the mining circuitry between the miner's wallets and other wallets (e.g., profit-sharing wallets such as wallets owned by a cryptocurrency mining pool manager).

Figure 6:
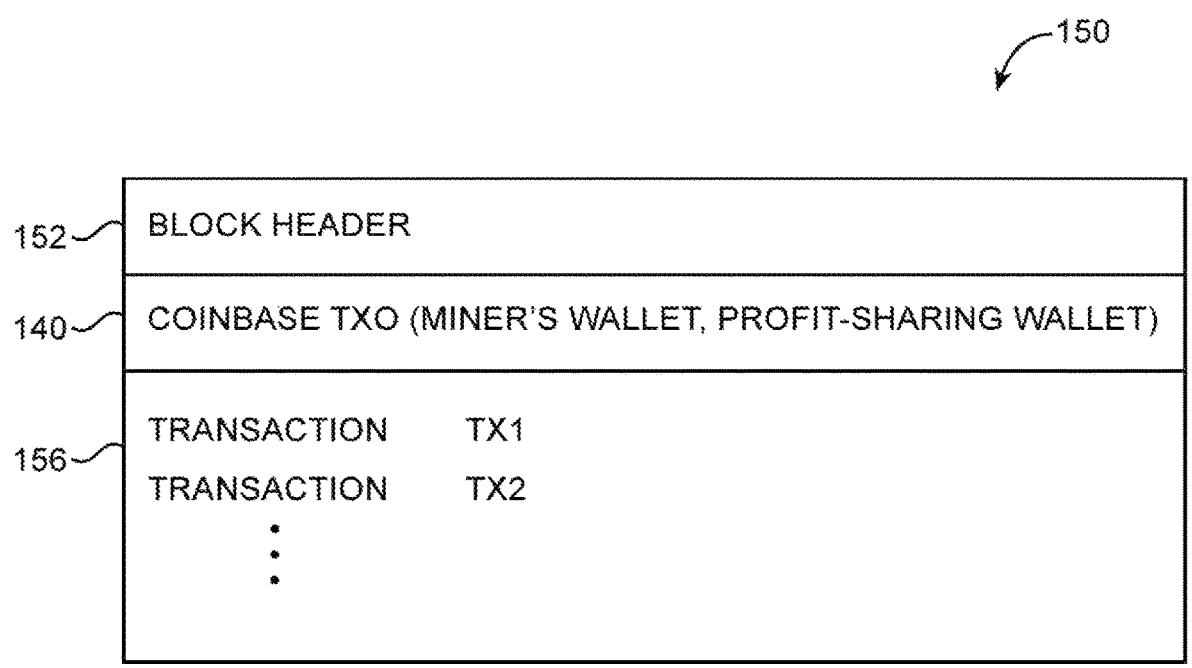
FIG. 6 is an illustrative block that may be generated by mining circuitry and recorded in a global ledger in accordance with an embodiment.

In performing mining operations to verify and record a set of transactions, mining circuitry may generate a block to be recorded in the global ledger as shown in FIG. 6. Block 150 of FIG. 6 may include block header 152, coinbase transaction TX0 (e.g., a coinbase transaction 140), and a set of transactions 156 to be recorded.

Figure 7:
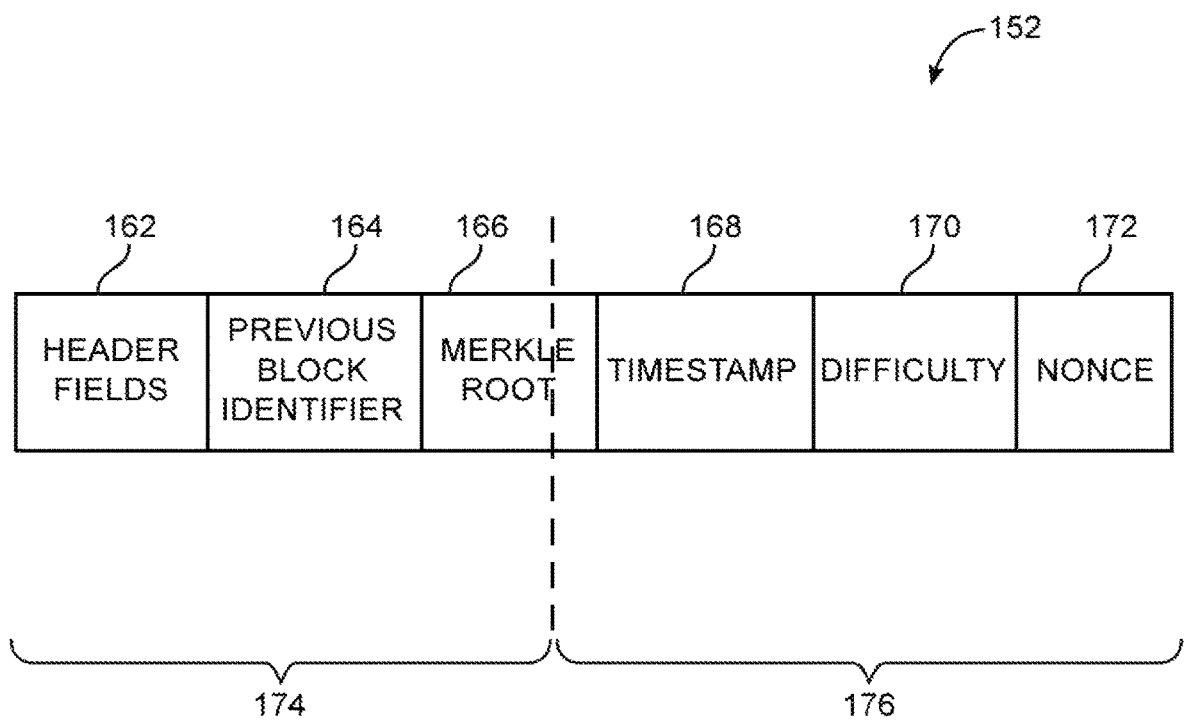
FIG. 7 is an illustrative block header that may be generated by mining circuitry in completing a cryptographic function (e.g., solving a cryptographic puzzle) according to a cryptocurrency protocol in accordance with an embodiment.

Block header 152 may include information that identifies block 150 and additional information generated by the mining circuitry to complete a function such as information satisfying a cryptographic puzzle. The additional information may be generated to solve the function (e.g., puzzle) for a given set of function inputs that are at least partially determined by block header 152 and for a desired output or range of outputs. FIG. 7 is a diagram of an illustrative block header 152. As shown in FIG. 7, block header 152 may include header fields 162, a previous block identifier 164, a Merkle root 166, a timestamp 168, a difficulty value 170, and a nonce value 172.

Header fields 162 may include any desired header fields such as a version number of the Bitcoin protocol. Previous block identifier 164 may identify a previous block in the global ledger (e.g., the global ledger may be a chain of blocks 152 in which each block references a previous block in the chain). For example, the previous block identifier may be a hash of the block header of the previous block.

Merkle root 166 may be generated from the transactions of block 150 including coinbase transaction 140 and the set of transactions 156. Merkle root 166 may provide a compact representation of the transactions in block 150. For example, Merkle root 166 may be a 256-bit (32 Byte) value, whereas the transactions of block 150 may be hundreds, thousands, or millions of bytes.

Difficulty value 170 is a parameter of the function (e.g., cryptographic puzzle) that is solved with block 150. For the Bitcoin protocol, the cryptographic puzzle involves generating block header 152 such that the hash of block header 152 is less than a predetermined value. The hash may be calculated using a protocol-determined hash function such as the Secure Hash Algorithm (SHA). The predetermined value may depend on difficulty value 170. For example, difficulty value 170 may specify how many leading zeros in a binary data representation are required in the hashed block header value.

Mining circuitry 116 may adjust one or more of the fields in block header 152 in order to provide block header 152 with a hash value that solves the cryptographic puzzle (e.g., a sufficiently small hash value). For example, the mining circuitry may adjust the nonce value or the timestamp value. As another example, the mining circuitry may adjust the extra-nonce value in the coinbase transaction of the block, which indirectly adjusts the Merkle root. Mining circuitry 116 may perform an exhaustive search by iterating over all possible solutions to the cryptographic puzzle.

Hash functions used by the cryptographic puzzle may operate in sequential steps (sometimes referred to herein as stages) on block header 152. If desired, a first portion 174 of block header 152 may be processed in a first hashing stage, whereas a second portion 176 of block header 152 may be processed in a second, subsequent hashing stage. Each hashing stage may involve a number of so-called rounds of logical operations. Each round of logical operations may involve the same logical functions (e.g., operating on different inputs for each round). For example, the output of a given round of logical operations in the hashing function may serve as an input for a subsequent round of the logical operations. The logical operations may iteratively be performed in this way to produce an output of the hashing function. For example, when a Secure Hashing Algorithm (SHA) 256 function is used, second portion 176 of block header 152 may be operated on by 64 rounds of SHA-256 before producing a hash output (e.g., an initial input to logical circuitry implementing the SHA-256 hashing algorithm may be operated on by the logic circuitry and provided as an input to a subsequent round of logic circuitry identical to the previous round of logical circuitry, and so on until the desired number of rounds of logic functions have been performed). This example is merely illustrative. The number of rounds of hashing may depend on the hashing algorithm performed by mining circuitry 116.

Portion 174 may include header fields 162, previous block identifier 164, and a first portion of Merkle root 166, whereas portion 176 may include a second portion of Merkle root 166, timestamp 168, difficulty value 170, and nonce value 172. The SHA function may produce an output value for the first stage based on portion 174 of block header 152. The output value of the first stage may serve as an input to the second stage of the SHA function along with portion 176 of block header 152. The second stage of the SHA function may produce the hash value of block header 152. The SHA function may be implemented using dedicated hardware circuitry on mining circuitry 116.

Figure 8:
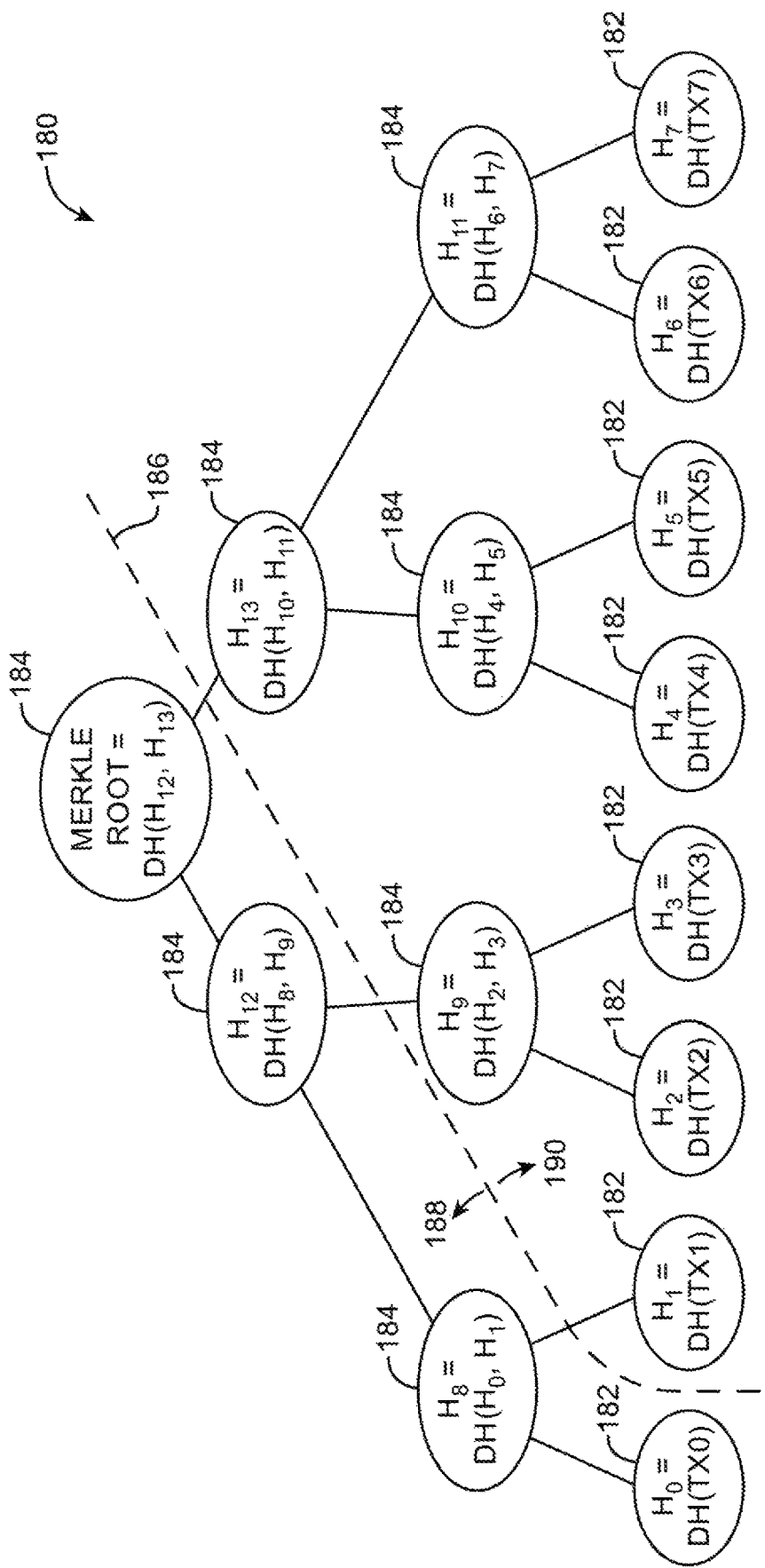
FIG. 8 is an illustrative Merkle tree that may be calculated by mining circuitry from a set of transactions in solving a cryptographic puzzle in accordance with an embodiment.

Merkle root 166 may be computed by generating a Merkle tree from the transactions of the corresponding block 150. FIG. 8 is a diagram of an illustrative Merkle tree 180 generated from a block including transactions TX0, TX1, TX2, TX3, TX4, TX5, TX6, and TX7. The example of FIG. 8 in which the block includes eight transactions is merely illustrative. A Merkle tree may be computed from any binary number of transactions (e.g., 2, 4, 6, 8, etc.). If a block does not contain a binary number of transactions, placeholder transactions may be added to complete the Merkle tree. Such placeholder transactions are used only in generating the Merkle tree and are not added to the block.

As shown in FIG. 8, Merkle tree 180 includes leaf nodes 182 that are each generated by computing the double hash of a respective transaction (e.g., using the SHA function). For example, hash value H0 is computed from the (double) hash (DH) of transaction TX0 (e.g., a coinbase transaction), whereas hash values H1, H2, H3, H4, H5, H6, and H7 are computed from transactions TX1, TX2, TX3, TX4, TX5, TX6, and TX7, respectively. Double hash operations may involve performing a cryptographic hashing function H(Z) on an input Z to generate an output Y and performing the same cryptographic hashing function H on the output Y of the first cryptographic hashing function to generate a double hashed output X (e.g., X=H(H(Z))), for example.

Merkle tree 180 may be organized as a binary tree in which each non-leaf node 184 has two child nodes. The nodes of each successive level of the tree may be computed by hashing nodes of a lower (previous) level. The second level of the tree (e.g., the nodes storing hash values H8, H9, H10, and H11) may be generated by double hashing the values stored in leaf nodes 182. For example, hash value H8 is generated by concatenating leaf values H0 and H1 and double hashing the concatenated result. Similarly, the third level of the tree may be generated by hashing the values of the second level (e.g., hash value H12 may be calculated by hashing the concatenation of H8 and H9, whereas hash value H13 may be calculated by hashing the concatenation of H10 and H11). The number of levels in the tree may depend on the number of transactions in the block. In the example of FIG. 8, the root of Merkle tree 180 is at the fourth level and is calculated from hashing values H12 and H13.

The hashed value at each node of Merkle tree 180 has a fixed, predetermined size (e.g., 256 bits), and is dependent on the values at the children of that node. The Merkle root therefore serves as a compact representation of all of the transactions in the corresponding block, because any changes to a transaction percolate upwards to the Merkle root. For example, changes to coinbase transaction TX0 causes hash value H8 to change, which modifies hash value H12, which then modifies the Merkle root value. Similarly, changes to any of the transactions result in changes to the Merkle root value.

Mining circuitry 116 may generate some or all of Merkle tree 180 while searching for solutions to a cryptographic puzzle. For example, in iterating through extra-nonce values in a coinbase transaction TX0, the mining circuitry may need to re-compute the Merkle root for each new extra-nonce value. To help reduce computation time and improve performance, the mining circuitry may re-compute only a portion of Merkle tree 180 during each iteration. In particular, changes to coinbase transaction TX0 only affect hash values H0, H8, H12, and the Merkle root, whereas the remaining nodes of the Merkle tree are unchanged. Dotted line 186 represents the edge of the Merkle tree that separates hash values that need to be recomputed and hash values that remain unchanged when modifying coinbase transaction TX0. Nodes to the left of edge 186 need to be recomputed (portion 188 of tree 180), whereas nodes to the right of edge 186 do not need to be recomputed (portion 190 of tree 180). The mining circuitry can store the constant nodes at edge 186 and reuse the stored values to re-compute the Merkle root. In the example of FIG. 8, hash values H1, H9, and H13 may be stored, whereas the remaining hash values of tree portion 190 do not need to be stored. If desired, nodes to the left of edge 186 may be computed off-chip by circuitry external to mining circuitry 116 (e.g., to save processing time, power, and chip area on mining circuitry 116).

Figure 9:
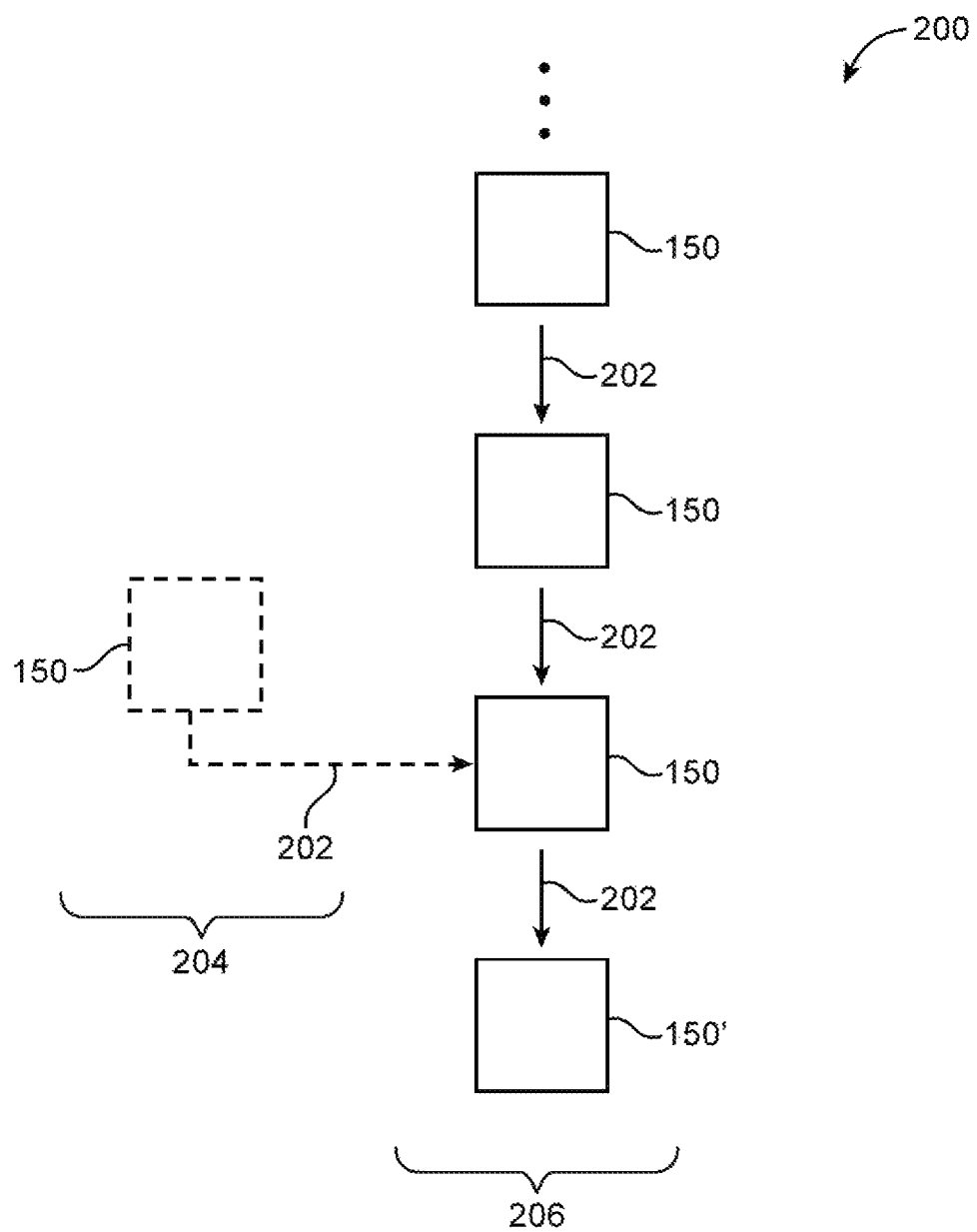
FIG. 9 is an illustrative block chain that may be maintained by a network of nodes as a global ledger of digital currency transactions in accordance with an embodiment.

FIG. 9 is an illustrative diagram of a global ledger that is formed from a block chain 200. As shown in FIG. 9, block chain 200 may include an originating block 150' that does not point to any previous block. For example, the previous block identifier 164 of block 150' does not identify any other blocks. Each successive block 150 identifies the previous block in the chain as shown by arrows 202 (e.g., the previous block identifier 164 of each block identifies the previous block in block chain 200).

During mining operations, a device collects a set of transactions that have not already been recorded in block chain 200. The mining circuitry may identify the last (most recently recorded) block in block chain 200. The mining circuitry may subsequently generate a new block 150 from the set of transactions such that the new block includes an identifier 164 that identifies the last block of block chain 200 and solves the cryptographic puzzle of the cryptocurrency protocol used by the block chain.

It is possible for block chain 200 to include multiple branches. For example, branch 204 may be generated when different puzzle solutions are discovered that each have the same previous block identifier. In this scenario, the branch that is longer and includes more blocks serves as the global register. In other words, branch 204 is ignored and the transactions in block 150 of branch 204 are not considered to be recorded, because branch 206 includes more blocks than branch 204 (i.e., four connected blocks in branch 206 compared to only three in branch 204).

Figure 10:
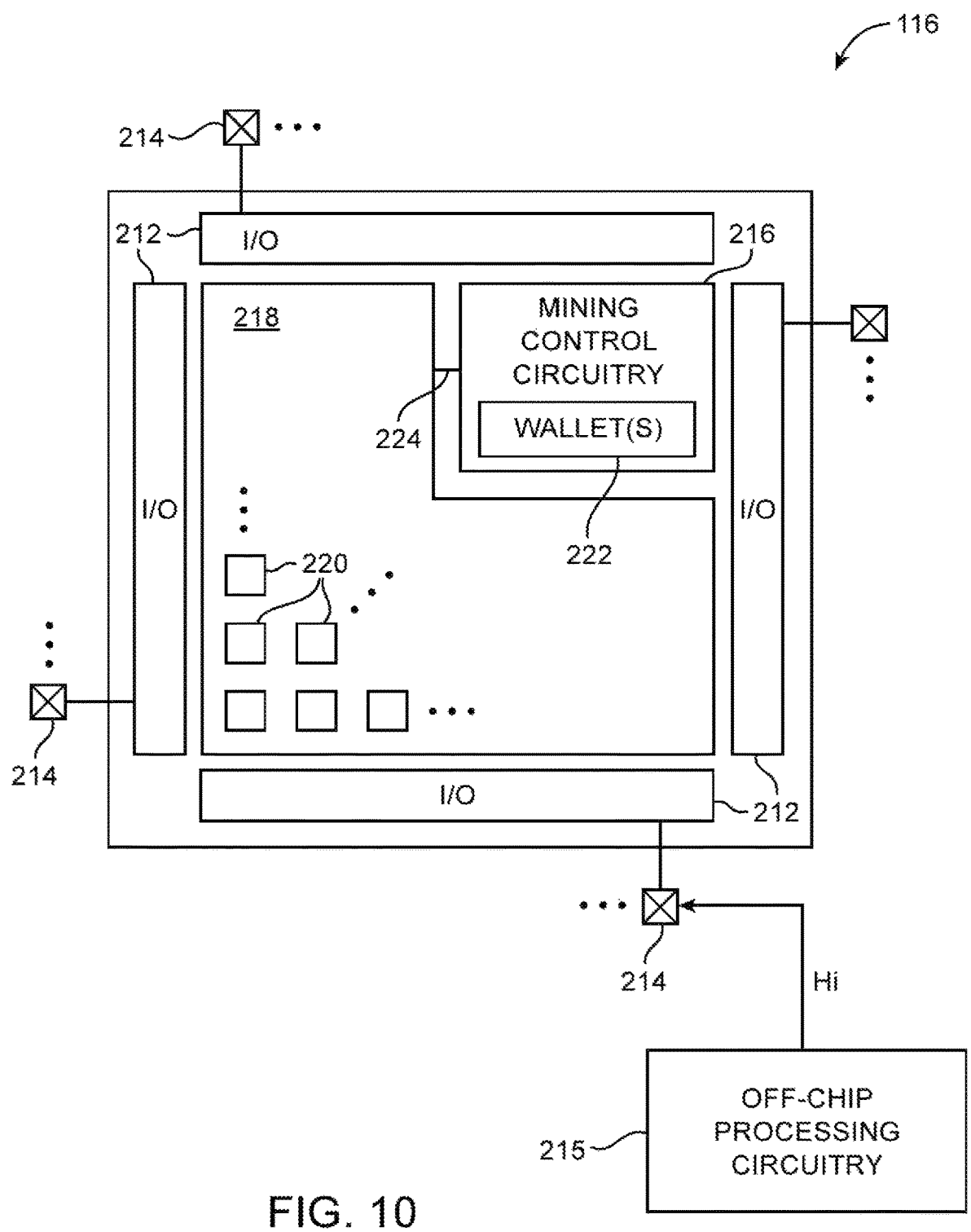
FIG. 10 is an illustrative diagram of mining circuitry for performing cryptographic hashing functions to generate cryptocurrency in accordance with an embodiment.

Mining circuitry such as circuitry 116 of FIG. 2 may be implemented as a dedicated integrated circuit (e.g., an application-specific integrated circuit) as shown in the diagram of FIG. 10. As shown in FIG. 10, integrated circuit 116 may have input-output (I/O) circuitry 212 for driving signals off of device 116 and for receiving signals from other devices via input-output pins 214. For example, I/O circuitry 212 and pins 214 may convey signals between mining circuitry 116 and other circuitry on electronic device 110 of FIG. 2. As shown in FIG. 10, mining circuitry 116 may receive data from off-chip processing circuitry such as processing circuitry 215. Off-chip circuitry 215 may be used to pre-compute portions of the hashing functions performed by circuitry 116. For example, off-chip circuitry 215 may compute hash values of portion 174 of block header 152 as shown in FIG. 7 and may provide the hash value (e.g., hash value $H_i$ to circuitry 116. Circuitry 116 may use hash value $H_i$ as an input when performing hashing functions on portion 176 of block header 152.

Mining circuitry 116 may include a core region 218 and control circuitry 216 that is coupled to the core region by paths 224 such as interconnect paths. Core region 218 may include multiple core circuits 220 that may be controlled by control circuitry 216 to identify solutions to a cryptographic puzzle. For example, each core circuit 220 may include dedicated logic that performs a cryptographic algorithm such as the SHA function on inputs provided by control circuitry 216 over paths 224. Core region 218 may include any desired number of core circuits that are operated in parallel by control circuitry 216 (e.g., tens, hundreds, or more core circuits).

The inputs provided by control circuitry 216 to a given core 220 may include a partially filled block header. For example, the partially filled block header may include header fields 162, previous block identifier 164, a current time, and difficulty value 170. The inputs may include the Merkle root of the transactions of the block to be solved, the transactions themselves, or sufficient information for computing the Merkle root (e.g., Merkle tree edge 186 of FIG. 8). The inputs may include initial hash values $H_i$ computed by off-chip processing circuitry 215. The remaining fields of the block header and block may be generated by core 220 in attempting to solve the cryptographic puzzle with inputs provided by the control circuitry.

Control circuitry 216 may partition the search space of possible solutions to the cryptographic puzzle and assign each core circuit 220 a different portion of the search space (e.g., so that multiple core circuits 220 operating in parallel can more efficiently search for solutions to the cryptographic puzzle). The search space may be partitioned based on the inputs provided by the control circuitry to the core circuits. The search space may be partitioned, for example, by assigning different ranges of nonce values 172 to different cores 220, by assigning different ranges of extra nonce values to different cores 220, etc. The search space to be partitioned may, for example, be assigned to circuitry 116 by a cryptocurrency mining pool manager.

If desired, each core circuit 220 in mining circuitry 116 may include dedicated logic that performs cryptographic hash functions such as Secure Hash Algorithm (SHA) functions. For example, cores 220 may perform SHA-2 hash functions (e.g., SHA-256 hash functions that are computed with 32-bit words as a message schedule input to each round of hashing and that outputs 256-bit hash outputs) on inputs provided by control circuitry 216 over paths 224.

Figure 11:
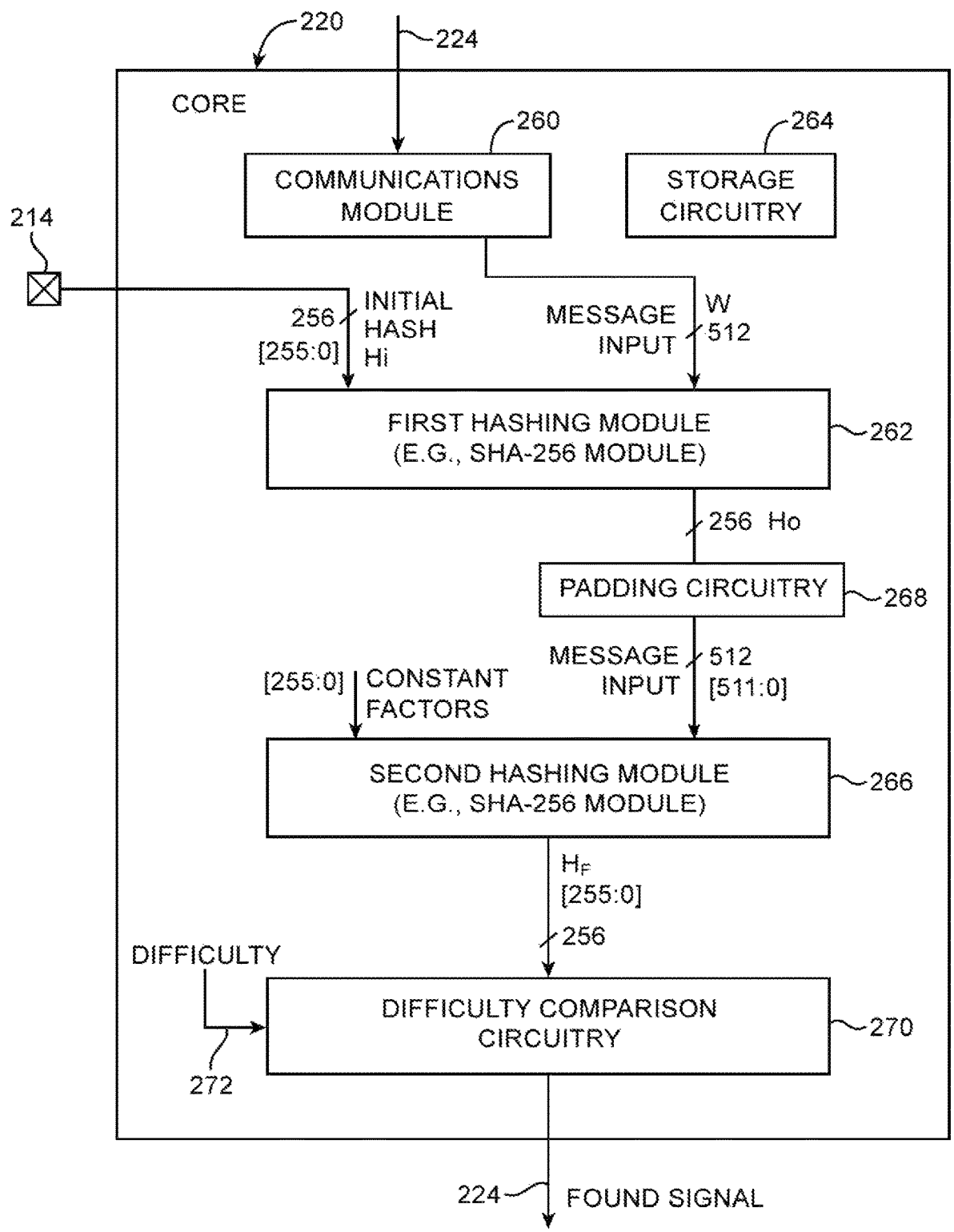
FIG. 11 is an illustrative diagram of a processing core in mining circuitry that may perform rounds of cryptographic hashing (e.g., SHA-256 hashing) in accordance with an embodiment.

FIG. 11 is an illustrative diagram of an exemplary core 220 in circuitry 116 of FIG. 10. In the example of FIG. 11, circuitry 220 is used for performing SHA-256 hashing on inputs received from control circuitry 216. However, this is merely illustrative and in general, core 220 may be used to perform any desired hashing algorithm on inputs received from control circuitry 216 (e.g., for use in a Bitcoin protocol, another digital currency protocol, or for use in a cryptographic system unrelated to a digital currency), or core 220 may be formed separate from mining circuitry 116 (e.g., on a dedicated integrated circuit or integrated circuit separate from mining circuitry 116) and may generally perform cryptographic hashing functions (e.g., SHA-256 hashing) on any desired input received from any desired source.

As shown in FIG. 11, core 220 may include communications circuitry such as communications module 260 that receives a message input W from control circuitry 216 via path 224. The message input W received from control circuitry 216 may include portions of block header 152 for use as an input to a SHA-256 hashing algorithm, for example. Core 220 may receive an initial hash input $H_i$ from external circuitry 215 via input/output port 214. The initial hash input $H_i$ may be computed off-chip based on a portion of a bit coin block header. For example, initial hash input $H_i$ may be computed at circuitry 215 by hashing portion 174 of block header 152 (e.g., using single or double hashing with a SHA-256 hashing protocol). Core 220 may include storage circuitry 264 that includes volatile and/or non-volatile memory.

If desired, core 220 may include multiple sequential hashing modules such as first hashing module 262 and second hashing module 266. First and second hashing modules 262 and 266 may be used to perform a double SHA-256 hash based on initial hash $H_i$ and the message input received on line 224. For example, first hashing module 262 (sometimes referred to herein as first SHA-256 module 262) may perform SHA-256 hashing on initial hash $H_i$ and message input W to produce a first hash output $H_O$. The first hash output $H_O$ may be provided as a message input to second hashing module 266 (sometimes referred to herein as second SHA-256 module 266). Second hashing module 266 may receive constant factors as an initial hash input (e.g., constant factors determined by the SHA-256 hashing algorithm such as one or more prime numbers). Second hashing module 266 may perform SHA-256 hashing on the constant factors using a message schedule based on first hash output $H_O$ to produce a second hash output $H_F$ (sometimes referred to herein as a final hash output).

In the example of FIG. 11, initial hash $H_i$ includes 256 bits whereas message input W includes 512 bits. First hash output $H_O$ may include 256 bits (e.g., as determined by the SHA-256 algorithm implemented by first hashing module 262). Core 220 may include padding circuitry 268 for padding first hash output $H_O$ with a desired number of zeros so that padded first hash output $H_O$ includes 512 bits (e.g., so that first hash output $H_O$ can be used as the 512-bit message input to second SHA-256 module 266). The constant factors input to second hashing module 266 may include 256 bits. Second hash output $H_F$ may include 256 bits (e.g., as determined by the SHA-256 algorithm implemented by second hashing module 266).

Core 220 may include difficulty comparison circuitry 270. Second hash output $H_F$ may be provided to difficulty comparison circuitry 270. Difficulty comparison circuitry 270 may compare second hash output $H_F$ to a predetermined difficulty value received at input 272. Difficulty value 272 may, for example, be received from control circuitry 216 or other desired external circuitry. Difficulty value 272 may, for example, be specified by the digital currency protocol implemented by mining circuitry 116 or by any other source (e.g., the difficulty value may be determined by the network of nodes operating on the Bitcoin protocol and may be adjusted over time so that a predictable number of solutions to the cryptographic puzzles are computed by the entire network in a given time period). If second hash output $H_F$ satisfies the predetermined difficulty value (e.g., if a number of least significant zero bits as specified by the Bitcoin protocol is sufficient or if value $H_F$ is less than the predetermined difficulty value), a found signal may be issued on line 224 indicating that a solution has been found for the given initial hash $H_i$ and message input W (e.g., for the Bitcoin block header associated with the initial hash and message). If no solution is found, the search space may be changed (e.g., using a different timestamp field 168, nonce field 172, extra nonce field, etc.) and computation may be repeated until a solution is found, until the search space is changed, or until a new block 150 in block chain 200 (FIG. 9) is received.

Each hashing module 262 and 266 may perform multiple rounds of SHA-256 hashing (e.g., as specified by the SHA-256 hashing protocol). Each round of hashing may involve performing the same logical functions on an input to that round to produce an output for that round. Each round of hashing may receive a portion of the message input W (e.g., a 32-bit word of the message input or a modified 32-bit word derived from the message input W). The output of a given round may serve as an input for the next round (along with another word from the message input).

In a scenario sometimes described herein as an example (e.g., when operating under the Bitcoin or SHA-256 protocol), first hashing module 262 may perform 64 rounds of hashing based on initial hash $H_i$ and input message W to produce first hash output $H_O$. Similarly, second hashing module 266 may perform 64 rounds of hashing based on the constant factors and first hash output $H_O$ to produce second hash output $H_F$. In typical scenarios, each round of SHA-256 hashing performed by first hashing module 262 (or second hashing module 266) is performed by dedicated logic on core 220. The output of a first round of SHA-256 logic in first hashing module 262 may serve as an input to the second round of SHA-256 logic in first hashing module 262 (along with a word generated by message schedule logic based on input message W), the output of which may serve as an input to a third round of SHA-256 logic in first hashing module 262 (along with an additional word generated by the message schedule logic based on input message W), etc. Each round of SHA-256 performed by first hashing module 262 and second hashing module 266 may be performed on a hash input and a corresponding message input. The hash input and message input may be combined as determined by the SHA-256 protocol to produce a hash output used as a hash input of the subsequent round of SHA-256 hashing. The hash output of the final (e.g., 64th) round may be output as the hash output value $H_O$ or $H_F$.

The logical operations implemented by the SHA-256 hashing protocol may be performed by dedicated logic hardware (e.g., hardcoded circuitry) on first and second hashing modules 262 and 266, for example. Performing logical operations using hardware may be significantly faster than performing the same logical operations using software.

In practice, it may be difficult for a single device 116 to find solutions to the cryptographic puzzle for generating cryptocurrency rewards for the operator of device 116. In order to increase the likelihood of generating cryptocurrency rewards, multiple users may join a so-called cryptocurrency mining pool. Members (e.g., mining devices operated by users) in a cryptocurrency mining pool work together to solve the cryptographic puzzle. For example, each member of the mining pool may contribute some amount of processing power (e.g., cryptographic hashing power for computing hashing rounds 262 and 266 of FIG. 11) to the mining pool. Each member may, for example, perform searches for solutions to the cryptographic puzzle over a respective search space. By dividing the search space over members of the pool, the pool may collectively find a solution to the puzzle more rapidly than a single member searching for the solution on its own. When one of the members of the pool finds a solution to the cryptographic puzzle (resulting in generation of a corresponding cryptocurrency reward as governed by the cryptocurrency protocol), the rewards may be shared amongst all of the members of the pool. The reward share may serve as an incentive to the members of the pool to contribute processing power to the pool. In this way, even if a given pool member only rarely finds a solution to the cryptographic puzzle, that user can still receive a stream of cryptocurrency earnings on average over time.

Figure 12:
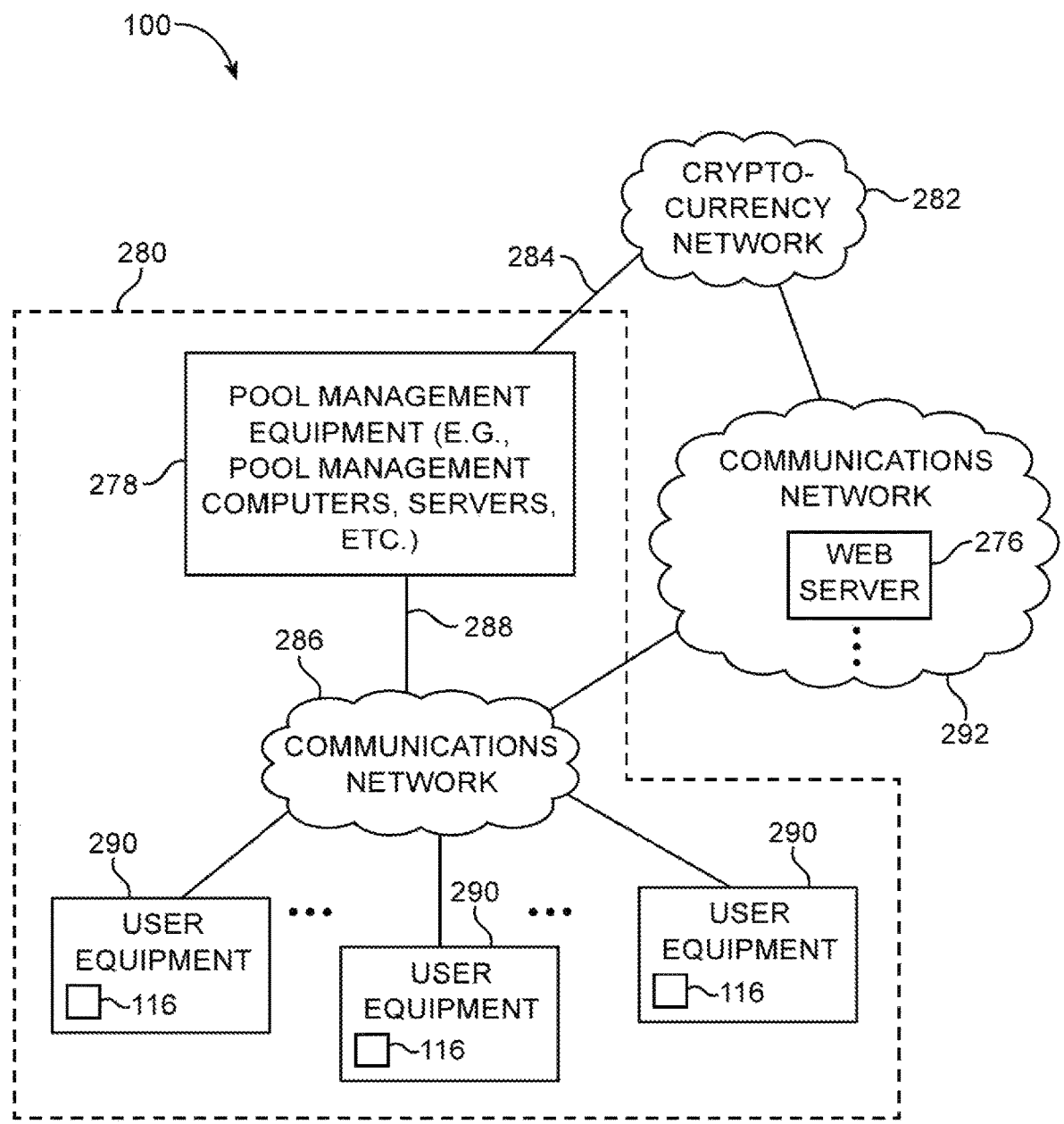
FIG. 12 is an illustrative diagram showing how multiple users may operate cryptocurrency mining equipment in a mining pool for sharing cryptocurrency rewards between the users in accordance with an embodiment.

FIG. 12 is an illustrative diagram showing how multiple users may join a mining pool to search for solutions of the cryptographic puzzle and share any corresponding cryptocurrency rewards. Each of the users may own or operate corresponding mining circuitry 116 that searches for solutions of the cryptographic puzzle for generating cryptocurrency rewards (e.g., bitcoin rewards).

As shown in FIG. 12, multiple users may each own and/or operate corresponding user equipment 290 in cryptocurrency mining pool 280. User computing equipment 290 may include mining circuitry 116 operated by a corresponding user. Pool 280 may include any desired number of user devices 290. For example, pool 280 may include one user device 290, two user devices 290, tens of user devices 290, hundreds of user devices 290, thousands of user devices 290, millions of user devices 290, etc. Each user device 290 may include any desired number of mining circuits 116. For example, each user device 290 may operate one mining circuit 116, two mining circuits 116, ten mining circuits 116, hundreds of mining circuits 116, etc. If desired, different user devices 290 may each operate different numbers of mining circuits having different processing capabilities. User equipment 290 may, if desired, be operated autonomously (e.g., without active input from a user) or semi-autonomously. In one example, equipment 290 may be installed or set up by a user and subsequently operated without direct interaction with a user for the duration of its operating life.

Pool 280 may be managed using pool management equipment 278. Pool management equipment 278 may include, for example, pool management computers (e.g., laptop and/or desktop computers) and/or pool management servers that manage and synchronize operations of mining circuitry 116 in pool 280. Pool management equipment 278 may be owned and/or operated by a pool manager (e.g., a mining pool manager organization or company or a selected user with management privileges).

Each user device 290 in pool 280 may be coupled to pool management equipment 278 via communications network 286 (e.g., a local area network, a wireless local area network, the internet, etc.). Communications network 286 may be coupled to one or more external web servers 276 that do not participate in the mining pool (e.g., over the internet or other communications networks). Web servers 276 may provide processing services and other digital services for devices in pool 280 and for other devices on which embedded cryptocurrency mining circuitry is formed.

Pool management equipment 278 may manage mining operations at user devices 290 and may manage sharing of rewards between users 290. For example, if a first user device 290 finds a solution to the cryptographic puzzle, pool management equipment 278 may ensure that the corresponding rewards are distributed to each user device 290 in pool 280. If desired, pool management equipment 278 may receive a share of the rewards generated by user devices 290 (e.g., a pool management wallet may receive a reward share of cryptocurrency whenever a solution is found by a member 290 or profit-sharing wallets owned by pool manager 278 and located on mining circuits 116 may receive a share of the rewards).

Pool management equipment 278 may serve as an interface between the user equipment of pool 280 and cryptocurrency network 282 (e.g., a network such as network 100 of FIG. 1). Pool management equipment 278 may, for example, assign a respective cryptographic search space for each user 290 (e.g., a corresponding range of nonce values, timestamp values, etc.). Pool management equipment 278 may verify that users 290 are performing their assigned mining duties before providing users 290 with a corresponding rewards share. For example, mining circuits 116 in pool 280 may periodically send confirmation signals to pool management equipment 278 over network 286 verifying that mining circuits 116 are contributing processing power to the mining pool. Cryptocurrency network 282 may include, for example, a network of nodes that maintains the Bitcoin protocol cryptocurrency or any other cryptocurrency protocol.

Pool management equipment 278 may manage sharing of rewards between users 290 using any desired sharing scheme. In one suitable arrangement, rewards are distributed to devices 290 using a weighting scheme in which some users receive more cryptocurrency rewards than other users. For example, management equipment 278 may distribute more rewards to user devices 290 having greater processing power, that cover a greater solution search space, or that solve the cryptographic puzzles with greater difficulty, than for user devices 290 having reduced processing power, that cover less solution search space, or that solve easier cryptographic puzzles.

A combination of the search space and selected difficulty (e.g., a product of the search space and the selected difficulty) may sometimes be referred to herein as the hashing share of mining circuitry 116. Pool manager 278 may allocate a greater share of the rewards generated by pool 280 to users 290 who operate mining circuitry 116 having a greater hashing share than users 290 operating mining circuitry with a smaller hashing share. As an example, a user that performs 1% of the hashing power of pool 280 may receive 1% of the cryptographic rewards generated by any user in the pool, whereas a user that performs 10% of the hashing power of pool 280 may receive 10% of the rewards. Mining circuitry 116 may inform pool manager 278 of the hashing share that is being performed by mining circuitry 116 or pool manager 278 may otherwise have knowledge of the hashing share of each user. Pool manager 278 may use the information about the hashing share of mining circuitry 116 to assign the appropriate reward share for the user of a device 290. By contributing a non-zero hashing share to pool 280, mining circuitry 116 may generate a stream of cryptocurrency rewards even if the corresponding user device does not solve the cryptographic puzzle.

Pool management equipment 278 may distribute cryptocurrency rewards shares to the wallets of user devices 290 by generating transactions 130 (FIG. 4). Transactions 130 generated by equipment 278 may include destination fields corresponding to the wallets of user devices 290 and having amount fields corresponding to the reward share for each user (e.g., a rewards share proportional to the hashing share of each user). If desired, transactions 130 may include destination fields corresponding to a wallet owned by the operator of pool management equipment 278 so that the operator of management equipment 278 receives a reward share (e.g., as an incentive for maintaining and managing pool 280).

User equipment 290 in pool 280 may include one or more electronic devices. Each instance of user equipment 290 shown in FIG. 12 may include, for example, one electronic device, two discrete electronic devices, or more than two electronic devices. Mining circuits 116 may be formed on any desired number of electronic devices operated by each user 290 (e.g., at least one electronic device operated by each user 290 includes at least one mining circuit 116). User equipment 290 may include some electronic devices that do not include mining circuits, if desired. Mining circuitry 116 may be formed on at least one of the electronic devices in each instance of user equipment 290 shown in FIG. 12. If desired, one or more electronic devices in user equipment 290 may perform operations that are not associated with mining cryptocurrency (e.g., the devices of users 290 need not be dedicated solely to performing cryptocurrency mining).

During operation of user equipment 290, multiple devices may communications with each other over respective communications links. For example, a first device 290 may communicate with a second device 290 over communications network 286 or other networks. In many scenarios, sensitive information is conveyed between devices or stored at a given one of the devices. Such sensitive information may include private data or data to which unauthorized access is restricted. Such private data may include, for example, credit card information, social security number information, secure database entries, name information, birthdate information, or any other sensitive data. Such sensitive information may be susceptible to unauthorized access by unauthorized devices. It would therefore be desirable to be able to authenticate the identity of an electronic device prior to establishing communications with that device (e.g., to prevent access to sensitive information by unauthorized devices).

Figure 13:
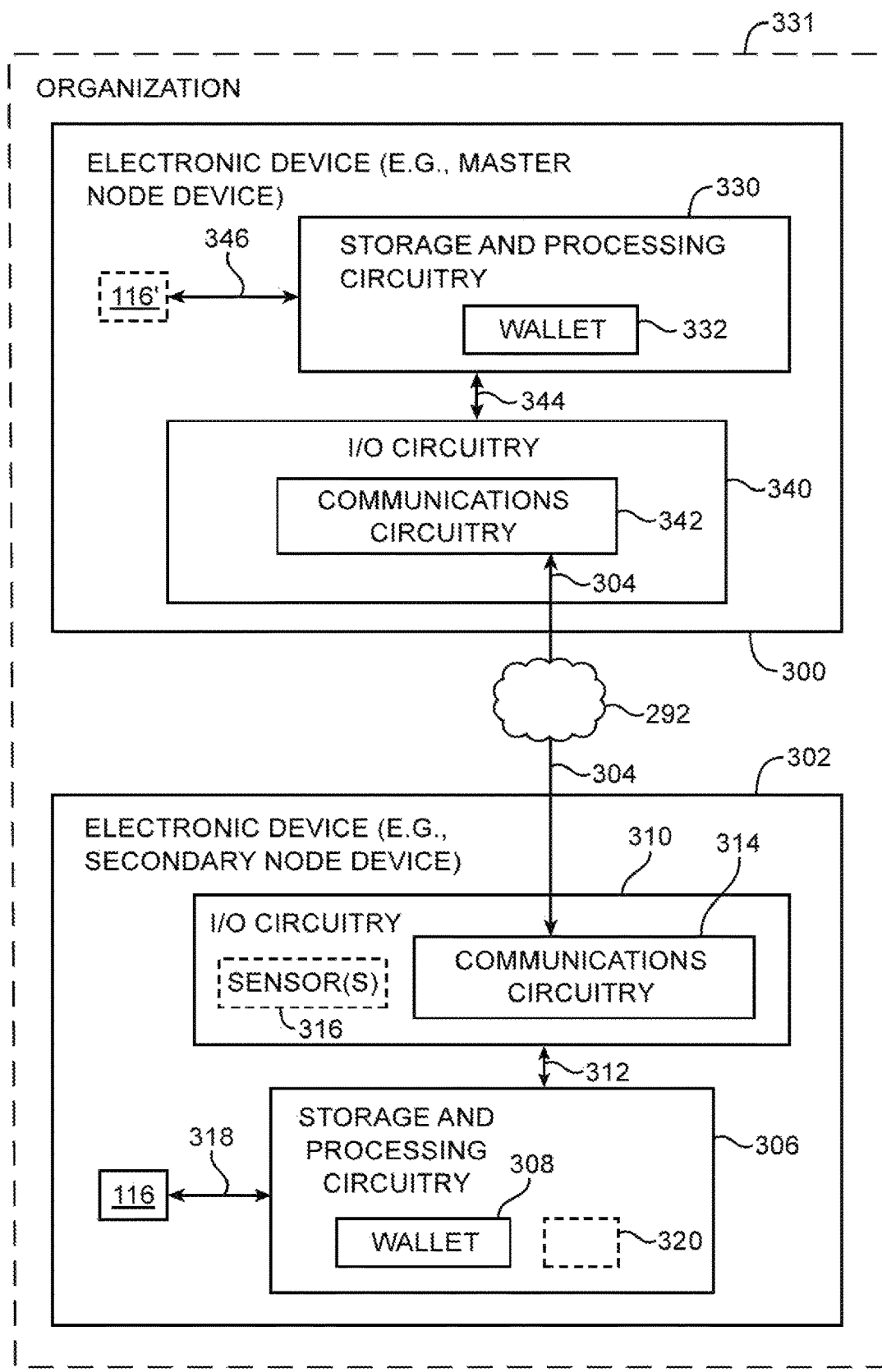
FIG. 13 is a diagram of illustrative electronic devices that may use cryptocurrency transactions for authenticating device identity prior to establishment of a communications link between the devices in accordance with an embodiment.

FIG. 13 is an illustrative diagram showing how a pair of electronic devices may communicate over a corresponding communications link. As shown in FIG. 13, a first electronic device 300 may communicate with a second electronic device 302 over communications link 304. Second electronic device 302 may request communications with electronic device 300 by transmitting a communications request to device 300 over communications link 304. Electronic device 302 that transmits the communications request may sometimes be referred to herein as secondary device 302, secondary node 302, or secondary node device 304, whereas device 300 that receives the request may sometimes be referred to herein as primary device 300, master device 300, or master node device 300. Devices 300 and 302 may be formed as user equipment 290 (FIG. 12) or as any other devices coupled to network 286 and/or 292 (e.g., devices 300 and 302 may participate in mining pool 280 or may be formed external to any mining pool).

Mining circuitry 116 may be embedded within secondary device 302 for mining cryptocurrency (e.g., bitcoins). As shown in FIG. 13, electronic device 302 may include storage and processing circuitry 306 (e.g., similar to circuitry 112 of device 110 as shown in FIG. 2). Storage and processing circuitry 306 may include non-volatile memory, volatile memory, processing circuitry such as one or more central processing units (CPUs), or any other desired storage and processing circuits. Processing circuitry 306 may include software and/or hardware for implementing one or more operating systems such as a mobile operating system or a computer operating system. The operating system may be used to store, access, and modify one or more software applications running on processor 306 (e.g., one or more mobile applications, etc.).

Processing circuitry 306 may include wallet information 308 associated with a cryptocurrency wallet of device 302. Wallet information 308 may include address information associated with the digital wallet of device 302. For example, wallet information 308 may include a public key and/or a private key of a public-private key pair associated with the digital wallet of device 302. The public keys may serve to authenticate transactions of cryptocurrency into wallet 308 and may be used to identify wallet 308. Such wallet information may be located on processing circuitry 306 and/or on mining control circuitry 216 of FIG. 10 (e.g., as wallets 222). Wallets 222 and/or 308 may be hardcoded into the corresponding circuitry if desired. If desired, wallet information 308 may be stored on processor 306 after calling wallet information 222 from mining circuitry 116. The public keys may be publically known and used by other entities to send cryptocurrency to wallet 308 using transactions 130.

If desired, wallet information 308 may be hardcoded (hardwired) into circuitry 306. In another suitable arrangement, wallet information 308 may be hardcoded into mining circuit 116 (e.g., such that wallet information 308 shown in FIG. 13 includes instructions for processor 306 to call or otherwise access the hardcoded information from mining circuitry 116). As an example, the public and/or private keys of digital wallets 308 may be identified using hardware description language (HDL) such as Verilog in designing the dedicated mining circuitry 116 and/or circuitry 306. In this scenario, design tools such as synthesis tools and place and route tools may be used to convert the HDL description of the dedicated mining circuitry to a circuit layout. The circuit layout may be used to generate a set of photo masks that are used in fabricating the dedicated mining circuitry with the hard-coded public keys (e.g., using fabrication tools such as lithography). In other words, dedicated logic in the mining circuitry and/or processing circuitry may identify wallets. The information in the dedicated logic is generally not accessible to any users. Examples of how wallets may be hardcoded into dedicated mining circuitry or processing circuitry 306 include mask programming, selectively shorting pins of the integrated circuit chip (chip-level hardcoding) or solder bumps of an integrated circuit package (package-level hardcoding) to a positive power supply or a power supply ground, permanently programming fuses or antifuses, or storing in non-volatile memory. If desired, hardcoding of wallets may be provided at a board level such as configuring jumpers on a motherboard to which the dedicated profit-sharing mining circuitry is mounted. Hardcoding the wallet information in circuitry 116 and/or 306 may help to protect the wallets (e.g., from being replaced by a user with a different wallet). In another suitable arrangement, wallet information 308 (e.g., corresponding public keys) may be soft-coded into circuitry 116 and/or 306 or stored in volatile or non-volatile memory on circuitry 306.

Applications running on processor 306 may include instructions on how to access or call wallet information 308 (e.g., wallet information 308 may be exposed to software running on processor 306). Applications running on processor 306 may call wallet information 308 during normal device operation so that shares of cryptocurrency rewards generated by mining circuitry 116 that are assigned to wallet 308 can be used for performing cryptocurrency transactions or for other purposes. For example, wallet information 308 may be called for performing device authentication operations (e.g., to verify the identity of device 302 to another device such as device 300 prior to establishing communications link 304). The wallet information may, for example, be used to generate an cryptocurrency authorization transaction to authenticate the identity of device 302.

Electronic device 302 may include input/output (I/O) devices 310 (e.g., similar to input/output devices 114 of FIG. 2). Input/output circuitry 310 may be coupled to storage and processing circuitry 306 via communications path 312. Input/output circuitry 310 may include any desired I/O devices such as buttons, speakers, microphones, displays, wired ports, touch pad devices, mouse devices, track pad devices, scroll wheels, touch screen devices, audio devices, and other input-output devices that accommodate user interaction with device 302. Input-output devices 310 may include communications circuitry such as communications circuitry 314 for communicating with other devices. Communications circuitry 314 may include, for example, wired communications circuitry and/or wireless communications circuitry.

Wired communications circuitry in I/O circuitry 310 may communicate with external devices via one or more wired paths and using any desired wired communications protocol (e.g., Ethernet protocols, Universal Serial Bus (USB) protocols, etc.). Wireless communications circuitry in I/O circuitry 310 may include wireless transceiver circuitry and antenna circuitry that communicate with external devices via one or more wireless links using any desired wireless communications protocols (e.g., IEEE 802.11 protocols such as the Wi-Fi protocol, Bluetooth protocols, cellular protocols such as Global System for Mobile Communications (GSM) protocols or Long Term Evolution (LTE) protocols, near field communications protocols, or any other desired wireless protocols). For example, communications circuitry 310 may transmit data to and receive data from communications network 292 (FIG. 12) via path 304. Path 304 may include any desired number of wired and/or wireless links between device 302, device 300, and other nodes in communications network 286 or 292.

If desired, I/O circuitry 310 may include sensor modules such as optional sensor circuitry 316. Sensor circuitry 316 may gather information about the surroundings of device 302 and may provide the gathered information to processing circuitry 306 for storage and/or additional processing. Sensor circuitry 316 may include, for example, image sensor circuitry, light sensor circuitry, proximity sensor circuitry, atmospheric sensor circuitry (e.g., barometer devices), temperature sensor circuitry, security sensor circuitry (e.g., motion detection or intruder detection circuitry), smoke detector circuitry, carbon monoxide detector circuitry, audio detector circuitry such as a microphone, touch sensor circuitry, or any other desired sensor circuitry. Sensor data gathered by device 316 may be stored and maintained at a database implemented on circuitry 306 and/or at databases external to device 302. In one suitable arrangement, master node device 300 may maintain a database at which sensor data gathered by sensors 316 is stored and maintained. For example, device 302 may periodically broadcast sensor data gathered by sensors 316 to device 300 for storage. Sensors 316 may be omitted from device 302 if desired.

Device 302 may include cryptocurrency mining circuitry 116. Mining circuitry 116 may be embedded (e.g., mounted or otherwise integrated) within device 302 and coupled to storage and processing circuitry 306 via communications path 318. Storage and processing circuitry 306 may relay information between mining circuitry 116 and communications network 292 (e.g., via I/O circuitry 310 and paths 318 and 312).

Mining circuitry 116 may include a dedicated mining chip or integrated circuit. For example, mining circuitry 116 and storage and processing circuitry 306 may be formed on two separate integrated circuits, two separate chips, or two separate printed circuit board structures within device 302. In another suitable arrangement, processing circuitry 306 and mining circuitry 116 may be formed on a common integrated circuit, a common chip, or a common printed circuit board structures. I/O circuitry 310 may be formed on a common integrated circuit as mining circuitry 116, on a common integrated circuit as processing circuitry 306, on a common integrated circuit as both mining circuitry 116 and processing circuitry 306, or on a dedicated integrated circuit or chip. Embedded mining circuitry 116, processing circuitry 306, and I/O circuitry 310 may be formed within an electronic device housing if desired. The electronic device housing may include a conductive (metal) housing, a plastic or dielectric housing, or combinations of these or other materials.

If desired, mining circuitry 116 may be integrated within a motherboard structure, within a video card structure, within a networking card structure, within a sound card structure, or otherwise embedded within the hardware architecture of device 302. Mining circuitry 116 may be permanently integrated within the hardware of device 302 such that circuitry 116 is not at any time removable from the hardware of device 302 (e.g., such that circuitry 116 is not at any time removable from the motherboard of device 302, from the soundcard of device 302, from a common integrated circuit with processing circuitry 306 on device 302, etc.). For example, mining circuitry 116 may be integrated within the hardware of device 302 (e.g., within the components of device 302) during manufacture of device 302 such that mining circuitry 116 cannot possibly be removed during operation of device 302 by an end user. In this way, mining circuitry 116 may be completely embedded or integrated within device 302. This example is merely illustrative and, if desired, mining circuitry 116 may be removable from device 302.

In another suitable arrangement, mining circuitry 116 may be formed from one or more logic regions of processing circuitry 306 as shown by dashed region 320. For example, processing circuitry 306 may include customizable logic circuitry such as a field-programmable gate array (FPGA) having programmable logic that is configured to form mining circuitry 116 (e.g., configured to perform the logical operations of mining circuitry 116). Mining circuitry 116 may be soft-coded or hard-coded as so-called Intellectual Property (IP) blocks within processing circuitry 306. In general, electronic device 302 may include mining circuitry 116 coupled to processor 306 via path 318 and/or mining circuitry at logic region 320.

Device 302 may be any desired electronic device that provides some functionality that is not directly associated with generating cryptocurrency. If desired, device 302 may additionally generate cryptocurrency using circuitry 116. For example, device 302 may be a laptop computer, desktop computer, tablet computer, mobile telephone, portable media player, television receiver, television system, security system, cable television receiver, audio system, vehicle system, server device, network router device, environmental monitoring device, adapter device, charger device, power adapter device, or any other electronic device. Device 302 may consume power in performing electronic device functions that are not related to mining cryptocurrencies. For example, in scenarios where device 302 is a temperature sensor device, device 302 may consume power to gather temperature measurements, transmit gathered temperature data to an external server, receive and process commands from an external server, etc.

Device 302 may also utilize power to perform cryptocurrency mining operations using circuitry 116 (e.g., to generate rewards or reward shares associated with cryptocurrency mining). Device 302 may perform mining operations in the background while performing other device operations or may perform mining operations while device 302 is not being used to perform other device operations (e.g., while device 302 is idle or in a sleep mode or while a user is not actively providing input to the device). In this way, device 302 may continuously or semi-continuously generate a stream of cryptocurrency rewards in real time for wallet 308 maintained on circuitry 306.

Processing circuitry 306 may serve as an interface between mining circuitry 116 and communications network 292. For example, processing circuitry 306 may communicate with pool manager 278 or crypto-currency network 282 via path 304. Processing circuitry 302 may provide information to pool manager 278 identifying that mining circuitry 116 is actively performing mining operations in pool 280 and may provide information to pool manager 278 identifying whether mining circuitry 116 has successfully solved the cryptographic puzzle. If desired, processing circuitry 306 may identify that pool manager 278 has provided crypto-currency reward shares to wallet 308. In another suitable arrangement, mining circuitry 116 may be omitted from device 302 (e.g., device 302 need not generate its own cryptocurrency rewards if desired).

During device operation, device 302 may attempt to communicate data with master node device 300. Devices 300 and 302 may establish communications link 304 prior to broadcasting data between the devices. Once the communication link has been successfully established, data may be freely conveyed between devices 300 and 302 via communications link 304.

Master node device 300 may include storage and processing circuitry 330. Storage and processing circuitry 330 may include non-volatile memory, volatile memory, processing circuitry such as one or more central processing units (CPUs), or any other desired storage and processing circuits. Processing circuitry 330 may include software and/or hardware for implementing one or more operating systems such as a mobile operating system or a computer operating system. The operating system may be used to store, access, and modify one or more software applications running on processor 330.

Processing circuitry 330 may include wallet information 332 associated with a corresponding cryptocurrency wallet. Wallet information 332 may include address information associated with a digital wallet associated with device 330. For example, wallet information 332 may include a public key and/or a private key of a public-private key pair associated with the digital wallet of device 300. The public keys may serve to authenticate transactions of cryptocurrency into wallet 332 and may be used to identify wallet 332. Such wallet information may be located on processing circuitry 306 and/or on mining control circuitry 216 of FIG. 10 (e.g., as wallets 222). Wallets 222 and/or 332 may be hardcoded into the corresponding circuitry. The public keys may be publically known and used by other entities to send cryptocurrency to wallet 332 using transactions 130.

If desired, wallet information 332 may be hardcoded (hardwired) into circuitry 330. As an example, the public keys of digital wallets 332 may be identified using hardware description language (HDL) such as Verilog in designing circuitry 330. In another suitable arrangement, wallet information 332 (e.g., corresponding public keys) may be soft-coded into circuitry 330 or stored in volatile or non-volatile memory on circuitry 330.

Applications running on processor 330 may include instructions on how to access or call wallet information 332 (e.g., wallet information 332 may be exposed to software running on processor 330). Applications running on processor 330 may call wallet information 332 during normal device operation so that cryptocurrency associated with device 300 may be used for device authentication operations or other desired operations.

Electronic device 300 may include input/output (I/O) devices 340 (e.g., similar to input/output devices 114 of FIG. 2). Input/output circuitry 340 may be coupled to storage and processing circuitry 330 via communications path 344. Input/output circuitry 340 may include any desired I/O devices such as buttons, speakers, microphones, displays, wired ports, touch pad devices, mouse devices, track pad devices, scroll wheels, touch screen devices, audio devices, and other input-output devices that accommodate user interaction with device 300. Input-output devices 340 may include communications circuitry such as communications circuitry 342 for communicating with other devices such as device 302. Communications circuitry 342 may include, for example, wired communications circuitry and/or wireless communications circuitry.

Wired communications circuitry in I/O circuitry 340 may communicate with external devices via one or more wired paths and using any desired wired communications protocol (e.g., Ethernet protocols, Universal Serial Bus (USB) protocols, etc.). Wireless communications circuitry in I/O circuitry 340 may include wireless transceiver circuitry and antenna circuitry that communicate with external devices via one or more wireless links using any desired wireless communications protocols (e.g., IEEE 802.11 protocols such as the Wi-Fi protocol, Bluetooth protocols, cellular protocols such as Global System for Mobile Communications (GSM) protocols or Long Term Evolution (LTE) protocols, near field communications protocols, or any other desired wireless protocols). For example, communications circuitry 342 may transmit data to and receive data from communications network 292 via path 304. Path 304 may include any desired number of wired and/or wireless links between device 302, device 300, and other nodes in communications network 286 or 292.

If desired, master node device 300 may optionally include corresponding mining circuitry 116'. Mining circuitry 116' may be embedded (e.g., mounted or otherwise integrated) within device 300 and coupled to storage and processing circuitry 330 via communications path 346. Storage and processing circuitry 330 may relay information between mining circuitry 116' and communications network 292 (e.g., via I/O circuitry 340 and paths 346 and 344).

Device 300 may be any desired electronic device that provides some functionality that is not directly associated with generating cryptocurrency. For example, device 300 may be a laptop computer, server device, database device, desktop computer, tablet computer, or any other electronic device. Device 302 may consume power in performing electronic device functions that are not related to mining cryptocurrencies. For example, device 300 may consume energy in maintaining a database of sensor data gathered by secondary device 302.

If desired, master node device 300 and secondary device 302 may both be owned and/or operated by a single organization or entity 331. Any cryptocurrency transactions to transfer cryptocurrency between wallet 332 on master node device 300 and wallet 308 on secondary device 306 may thereby involve no transfer of value between different organizations or entities (e.g., because both wallets are owned by a single organization 331). Transfer of cryptocurrency between the devices may, if desired, be used to verify device authenticity prior to establishing communications between devices 300 and 302 (e.g., without transferring actual value to another organization).

Prior to establishing communications with secondary device 302, master node device 300 may receive a request for communication from device 302. In response to receiving the request, device 300 may perform device authentication operations to verify the identity of secondary device 302 (e.g., in order to ensure that the request for communication was received from a trusted source). If device 300 is able to verify the identity of device 302, device 300 may establish communications between device 300 and device 302 and may begin to receive and store data received from device 302. By verifying the authenticity of device 302, device 300 may prevent unauthorized devices from transmitting data to master node device 300 and may prevent unauthorized devices from accessing sensitive data maintained by device 300.

Figure 14:
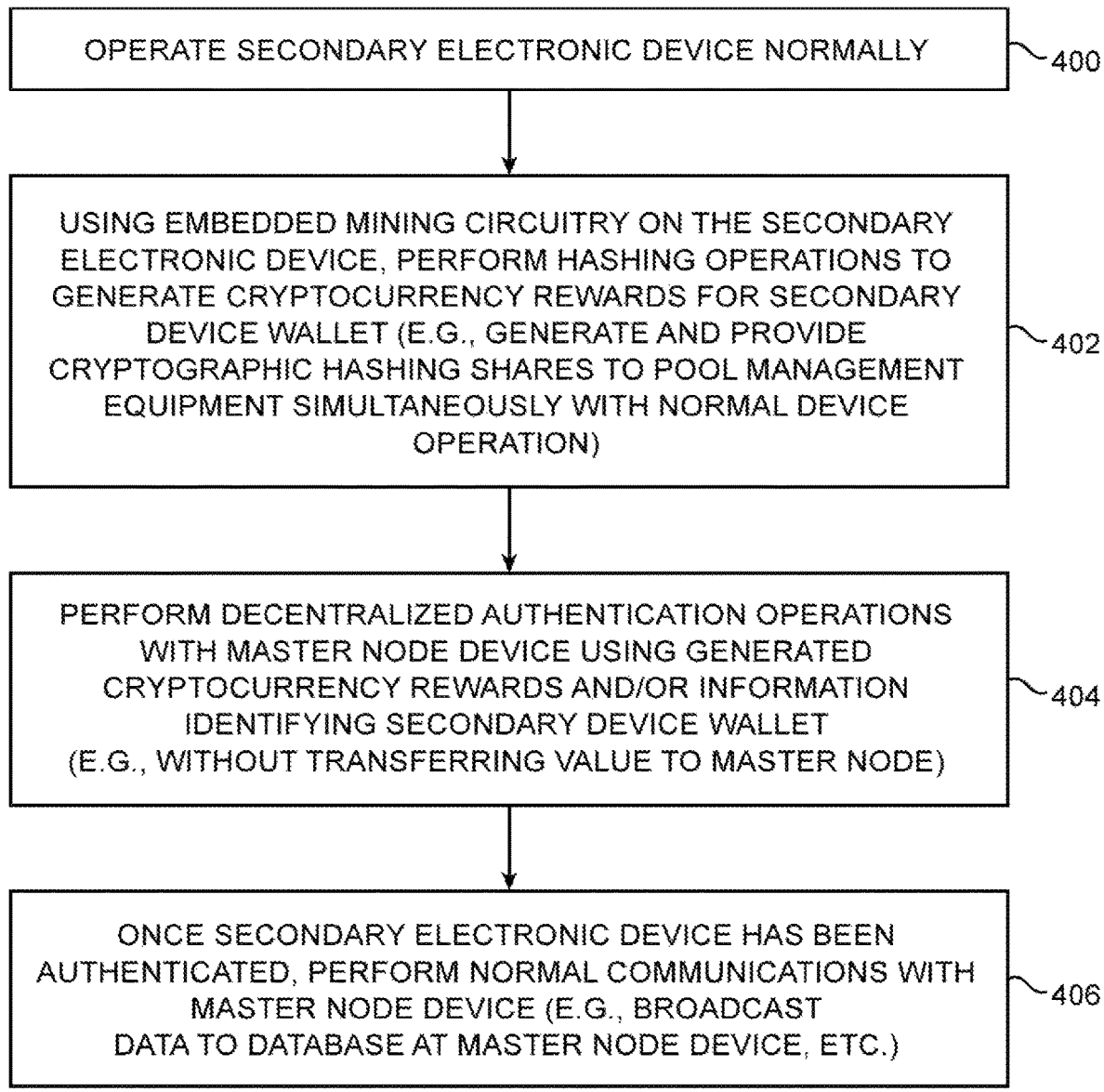
FIG. 14 is a flow chart of illustrative steps that may be performed by an electronic device for authenticating its identity prior to establishing a communications link with an external device in accordance with an embodiment.

Device 300 may use cryptocurrency information associated with secondary device 302 to verify the identity of secondary device 302 prior to establishing the communications link between the devices. Secondary device 302 may transmit cryptocurrency wallet information to primary device 300 that is used by primary device 300 to authenticate device 302. FIG. 14 is a flow chart of illustrative steps that may be performed by secondary device 302 to authenticate its identity with master device 300 using cryptocurrency wallet information.

At step 400, device 302 may operate normally. For example, sensors 316 may gather sensor data, a user of the device may use the device to performed desired device applications, etc.

At step 402, integrated mining circuitry 116 on device 302 may complete a function according to a cryptocurrency protocol (e.g., may solve a cryptographic puzzle according to the cryptocurrency protocol) to generate cryptocurrency rewards. The cryptocurrency rewards may be provided to device wallet 308 maintained on device 302. For example, the public key of a cryptographic public-private key pair associated with wallet 308 may be used to provide cryptocurrency rewards to device 302 (e.g., by using the public key in a destination address field of a cryptocurrency transaction such as transaction 130 of FIG. 4 or coinbase transaction 140 of FIG. 5). If desired, mining circuitry 116 may communicate directly to cryptocurrency network 282. In another suitable arrangement, mining circuitry 116 may participate in a mining pool 280 and may communicate with pool manager 278 (FIG. 12) for performing the cryptographic hashing operations (e.g., circuitry 116 may communicate with network 282 through pool manager 278). Mining circuitry 116 may generate cryptocurrency rewards concurrently with normal device operation (e.g., step 402 may be performed concurrently with step 400) or while device 300 is in a cryptocurrency mining mode or an idle mode, for example.

This example is merely illustrative. If desired, step 402 may be omitted and other sources may be used to provide cryptocurrency for device wallet 308. For example, other mining circuitry on other devices (e.g., devices operated by organization 331) may generate cryptocurrency rewards that are provided to device wallet 308. As another example, wallet 308 may be pre-loaded with a predetermined amount of cryptocurrency (e.g., upon installing device 302 within a system, upon device boot up, etc.).

At step 404, device 302 may determine that communication with an external device such as master node device 300 is desired. Device 302 may perform device authentication operations with master node device 300 using cryptocurrency rewards stored on wallet 308 or using other information associated with wallet 308. By using cryptocurrency information maintained by distributed cryptocurrency network 282, devices 300 and 302 may perform authentication in a decentralized manner (e.g., without using a centralized authentication server such as a key server). If desired, the device authentication operations may be performed using cryptocurrency information associated with wallet 308 without transferring value to other entities or organizations. The authentication operations may be performed to verify the identity of second device 302 to master node device 300.

After secondary device 302 has been authenticated by master node device 300, normal communications may be performed between secondary device 302 and master node device 300 (step 406). For example, secondary device 302 may begin to broadcast data to master node device 300 and master node device 300 may store or otherwise process the received data. As another example, device 302 may obtain access to data maintained or stored on device 300 after successful authentication. If device 302 is not authenticated (e.g., if master node 300 is unable to verify the identity of device 302 or if master node 300 determines that device 302 is not authorized for communications), communications between device 300 and device 302 may be blocked (e.g., device 300 may block access to data for device 302 or may drop or otherwise block data received from device 302).

Figure 15:
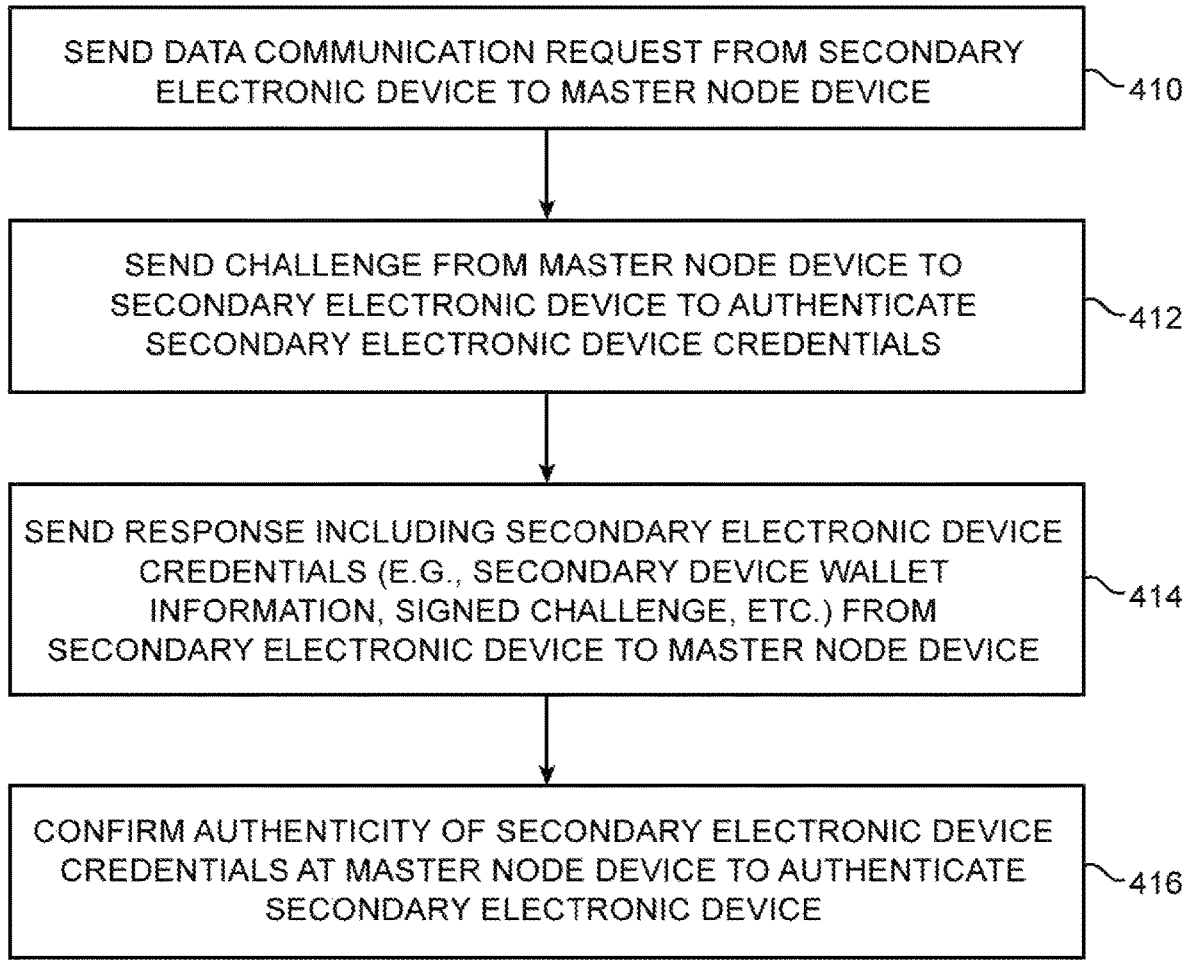
FIG. 15 is a flow chart of illustrative steps that may be performed by an electronic device to authenticate its identity by sending cryptocurrency wallet information to an external electronic device in accordance with an embodiment.

FIG. 15 is a flow chart of illustrative steps that may be performed by devices 300 and 302 to authenticate the identity of second device 302 using cryptocurrency wallet information prior to data transmission. The steps of FIG. 15 may, for example, be performed while processing step 404 of FIG. 14.

At step 410, secondary device 302 may send a request to establish data communications to master node device 300. For example, secondary device 302 may send a request data packet or stream of data packets that indicate to master node device 300 that secondary device 302 is requesting establishment of communication over link 304.

At step 412, master node device 300 may transmit a challenge (e.g., a challenge data packet or stream of packets) to secondary device 302 in response to receiving the request from secondary device 302. The challenge may instruct secondary device 302 to provide authentic credentials that verify the identity of secondary device 302.

At step 414, secondary device 302 may transmit device credentials to master node device 300. The device credentials may include cryptocurrency information associated with secondary device wallet 308. If desired, a cryptographic engine on secondary device 302 may digitally sign the received challenge using a private key of a corresponding public-private key pair. The private key may, for example, be hardcoded into processing circuitry 306 and may be called in response to receiving the authentication challenge from master node device 300. The signed challenge may be transmitted to master node device 300 (e.g., the device credentials may include a digitally signed version of the received challenge that has been signed using the private key of secondary device 302).

At step 416, master node device 300 may confirm the authenticity of secondary device 302 using the received device credentials. For example, master device 300 may compare the received cryptocurrency information to stored information known to be associated with an authentic device (e.g., a device for which communications with node 300 is allowed). If the received cryptocurrency information matches the expected cryptocurrency information, master device 300 may identify that secondary device 302 is authentic. For example, master device 300 may identify the public key from the public-private key pair corresponding to the private key used to sign the challenge at secondary device 302. Master device 300 may use the identified public key to verify that the digitally signed challenge received from secondary device 302 is authentic.

Figure 16:
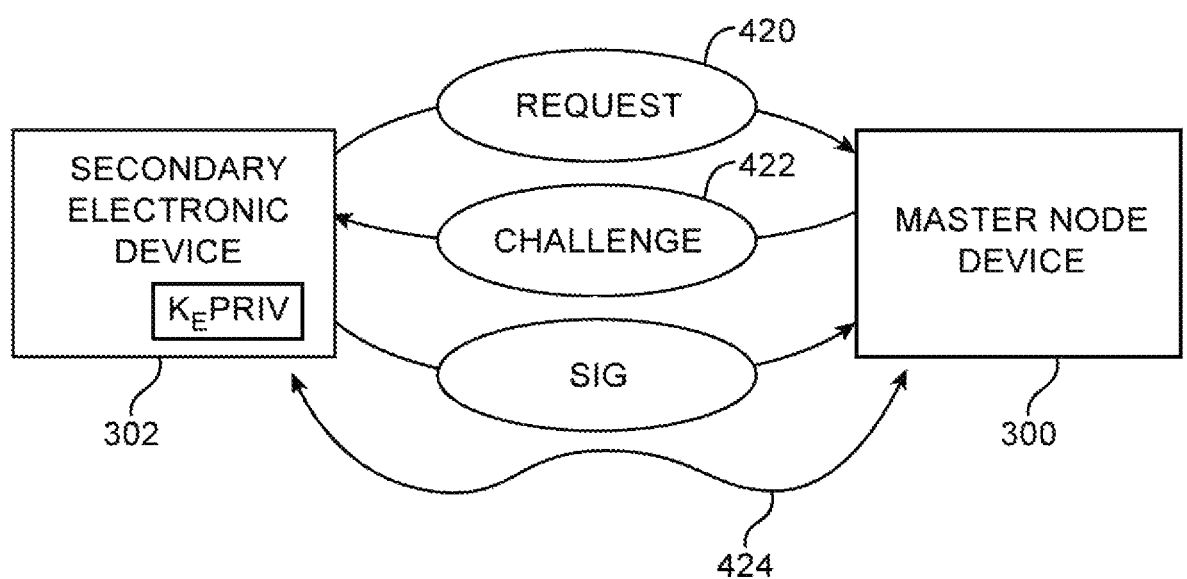
FIG. 16 is a flow diagram showing how an illustrative electronic device may authenticate its identity by transmitting cryptocurrency wallet information to an external device prior to transmitting data to the external device in accordance with an embodiment.

FIG. 16 is an illustrative flow diagram showing how secondary device 302 may transmit cryptocurrency wallet information 308 to master node device 300 to verify the authenticity of secondary device 302. As shown in FIG. 16, secondary device 302 may transmit communications request 420 to master node device 300 (e.g., while processing step 410 of FIG. 15). Master node device 300 may generate challenge 422 in response to receiving communications request 420 (e.g., a predetermined sequence of digital bits or characters). Challenge 422 may be transmitted to secondary device 422. Secondary device 302 may transmit information about cryptocurrency wallet 308 to master node device 300 in response to receiving challenge 422. For example, secondary device 302 may use hardcoded private key $K_EPRIV$ of a corresponding cryptographic public-private key pair associated with device wallet 308 to digitally sign challenge 422 to generate signed challenge SIG that is transmitted to master node device 300.

Master node device 300 may identify a public key $K_EPUB$ from the key pair associated with $K_EPRIV$ (e.g., by requesting the key from an external key server, obtaining the key from a database, etc.). Device 300 may use the public key to verify the authenticity of signed challenge SIG. If master node device 300 determines that the signature is authentic, master node device 300 may establish communications link 424 between the devices (e.g., over path 304 of FIG. 13). Normal data communications may subsequently proceed over link 424. If master node device 300 determines that the received signature is not authentic, link 424 is not established. Private key $K_EPRIV$ may be used by secondary device 302 to perform other cryptocurrency transactions that are not associated with device authentication for example (e.g., to digitally sign other cryptocurrency transactions with other devices or entities). In general, digitally signed authentication information SIG may be any digitally signed data that is signed using key $K_EPRIV$ (e.g., signed data SIG need not be a signed version of challenge 422).

Performing authentication operations by transmitting wallet information 308 (e.g., digitally signed data) between device 302 and device 300 may involve no transfer of cryptocurrency between devices and may involve no transfer of value between entities. If desired, cryptocurrency may be transferred between device wallets for performing device authentication operations (e.g., using cryptocurrency transactions). Transferring cryptocurrency between devices for performing device authentication information may allow further confirmation of the authenticity of device 302 by cryptocurrency network 282. Transferring cryptocurrency for performing device authentication may allow master node device 300 to perform filtering or rate limiting operations on devices requesting communications with master node device 300.

Figure 17:
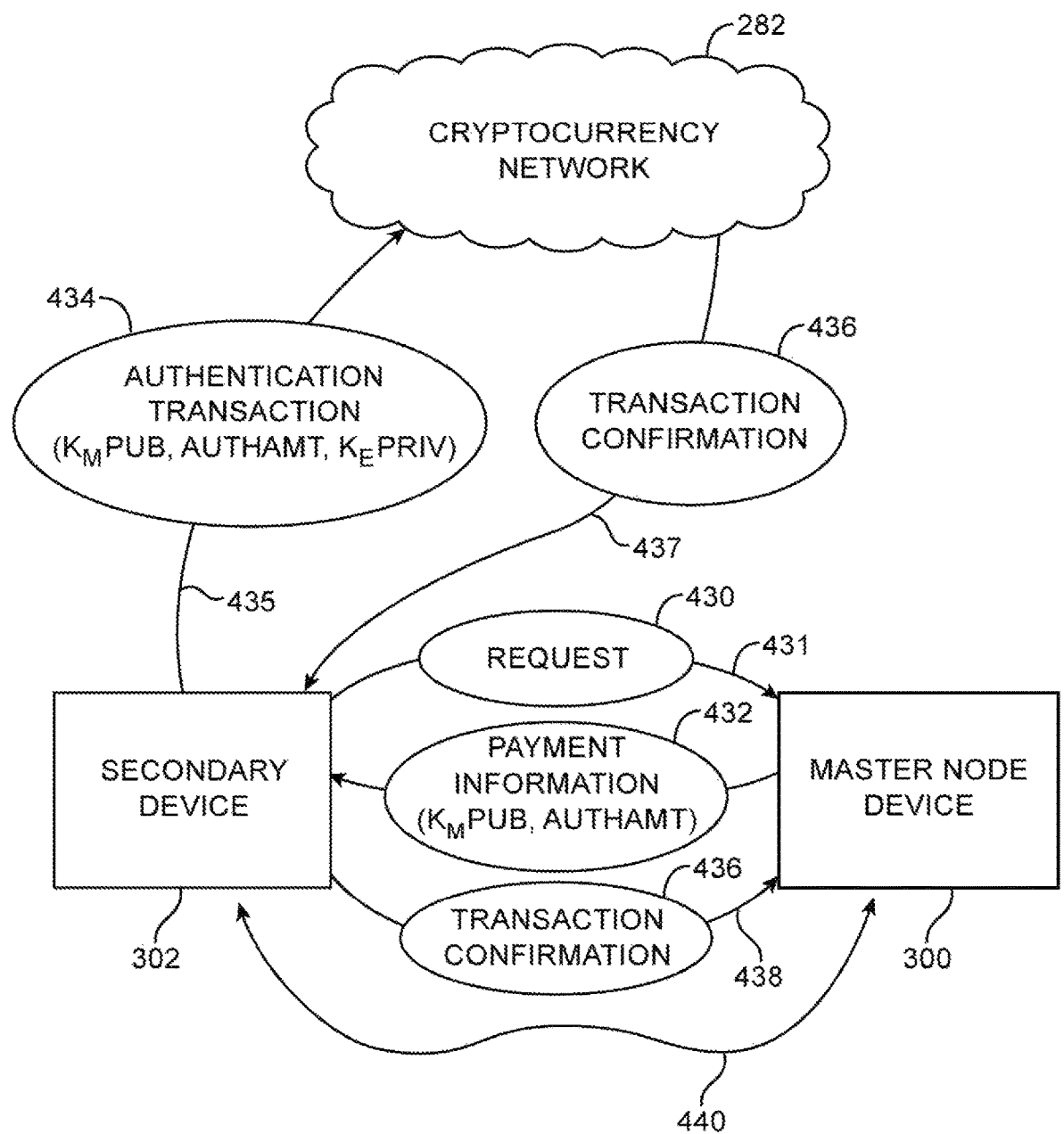
FIG. 17 is a flow diagram showing how an illustrative electronic device may authenticate its identity for an external device by generating an authentication cryptocurrency transaction that is transmitted to a cryptocurrency network in accordance with an embodiment.

FIG. 17 is an illustrative flow diagram showing how master node device 300 may authenticate secondary device 302 using a cryptocurrency transaction between device wallets. Secondary device 302 may transmit communications request 430 to master node device 300 as shown by path 431. In response to receiving communications request 430, master node device 300 may generate payment information 432. Device 300 may transmit payment information 432 to secondary device 302 as shown by path 433.

Payment information 432 may include information about wallet 332 on master node device 300. For example, payment information 432 may include a public key $K_MPUB$ of a public-private cryptographic key pair associated with master node device 300 (e.g., a public key hardcoded into processing circuitry 330). Master node device 300 may select a corresponding authentication amount AUTHAMT. Payment information may include selected authentication amount AUTHAMT. Master node device 300 may select authentication amount AUTHAMT based on any desired criteria. Amount AUTHAMT may be identified by an amount of cryptocurrency (e.g., an amount of bitcoins or Satoshis). If desired, device 300 may select amount AUTHAMT to perform a desired amount of device filtering (e.g., to filter out a predetermined number of devices that are attempting to connect to master node device 300).

Secondary device 302 may generate a cryptocurrency transaction 434 (e.g., similar to transaction 130 of FIG. 4) based on received payment information 432. Transaction 434 may sometimes be referred to herein as a cryptocurrency authentication transaction, an authentication transaction, or an authentication cryptocurrency transaction. Cryptocurrency authentication transaction 434 may be used solely for the purposes of authenticating device 302 for master node device 300 and may, for example, involve no transfer of value to other organizations. For example, devices 302 and 300 may be owned or operated by the same organization (e.g., organization 331) such that any cryptocurrency transferred between devices 302 and 300 involves no transfer of value to other organizations. Similarly, authentication transaction 434 may not involve the exchange of cryptocurrency for goods or services. If desired, device 302 may generate other cryptocurrency transactions in exchange for goods or services.

Device 302 may generate cryptocurrency transaction 434 having a destination field that includes the destination wallet and an amount field that includes an authentication amount as specified by payment information 432. For example, the destination field of authentication transaction 434 may include public key $K_M$PUB of master node device 300 and an amount field that includes amount AUTHAMT. Secondary device 302 may identify device wallet 308 (e.g., a public key of wallet 308) in the source field of transaction 434 and may sign transaction 434 using the private key $K_E$PRIV of device 302 (e.g., to ensure the authenticity of the transaction). The private key used to sign transaction 434 may, for example, be the private key of a cryptographic public-private key pair of wallet 308. The public key used in the source field of transaction 434 may be the public key of the public-private key pair. Identifying device 302 in the source field of transaction 434 and/or signing transaction 434 using private key $K_E$PRIV may serve to verify that the expected device 302 generated transaction 434 (e.g., to verify that an authentic device generated the transaction).

Device 302 may transmit transaction 434 to cryptocurrency network 282 (e.g., via pool manager 278 or directly) as shown by path 435. The nodes of network 282 may decrypt transaction 434 using the public key $K_E$PUB of device 302 if desired (e.g., the public key corresponding to private key $K_E$PRIV). This example is merely illustrative. In general, transaction 434 may involve transfer of cryptocurrency from device wallet 308 to any other predetermined wallet (e.g., a wallet maintained on master node device 300 or some other wallet owned by the operator of devices 300 and 302).

Cryptocurrency network 282 may verify transaction 434 and may record the transaction in the global ledger (e.g., in the cryptocurrency block chain or in a separate side chain that is not broadcast globally). In this way, cryptocurrency stored in device wallet 308 may be transferred to a predetermined wallet in a manner that is acknowledged and verified by each node of network 282. Cryptocurrency network 282 may transmit transaction confirmation information 436 to device 302 as shown by path 437. Confirmation information 436 may identify that cryptocurrency in the amount AUTHAMT has been successfully transferred from device wallet 308 to the predetermined destination wallet (e.g., wallet 332), and that the transaction has been successfully verified and recorded by the cryptocurrency network. Successful verification of transaction 434 by network 282 may serve as a distributed verification of the authenticity of the device 302 that generated the transaction. As the authenticity of the wallet information 308 of device 302 has been verified by cryptocurrency network 282, confirmation information 436 may serve to identify the authenticity of secondary device 302 (e.g., to verify that the expected secondary device 302 is the device that generated transaction 434). If desired, network 282 may transmit confirmation information 436 directly to master node device 300 in addition to providing the information to device 302 or instead of providing the information to device 302.

Secondary device 302 may forward received confirmation information 436 to master node device 300 as shown by path 438. Master node device 300 may verify that successful payment has taken place upon receiving the transaction confirmation. As verification of successful payment serves as authentication of the identity of device 302 by the distributed cryptocurrency network 282, master node device 300 may verify that the identity of device 302 is authentic using confirmation 436. After verifying the authenticity of device 302, master node device 300 may establish communications link 440 with secondary device 302 (e.g., over communications path 304 of FIG. 13). Device 302 may subsequently broadcast data to master node device 300 and/or access data maintained at master node device 300 over link 440.

Figure 18:
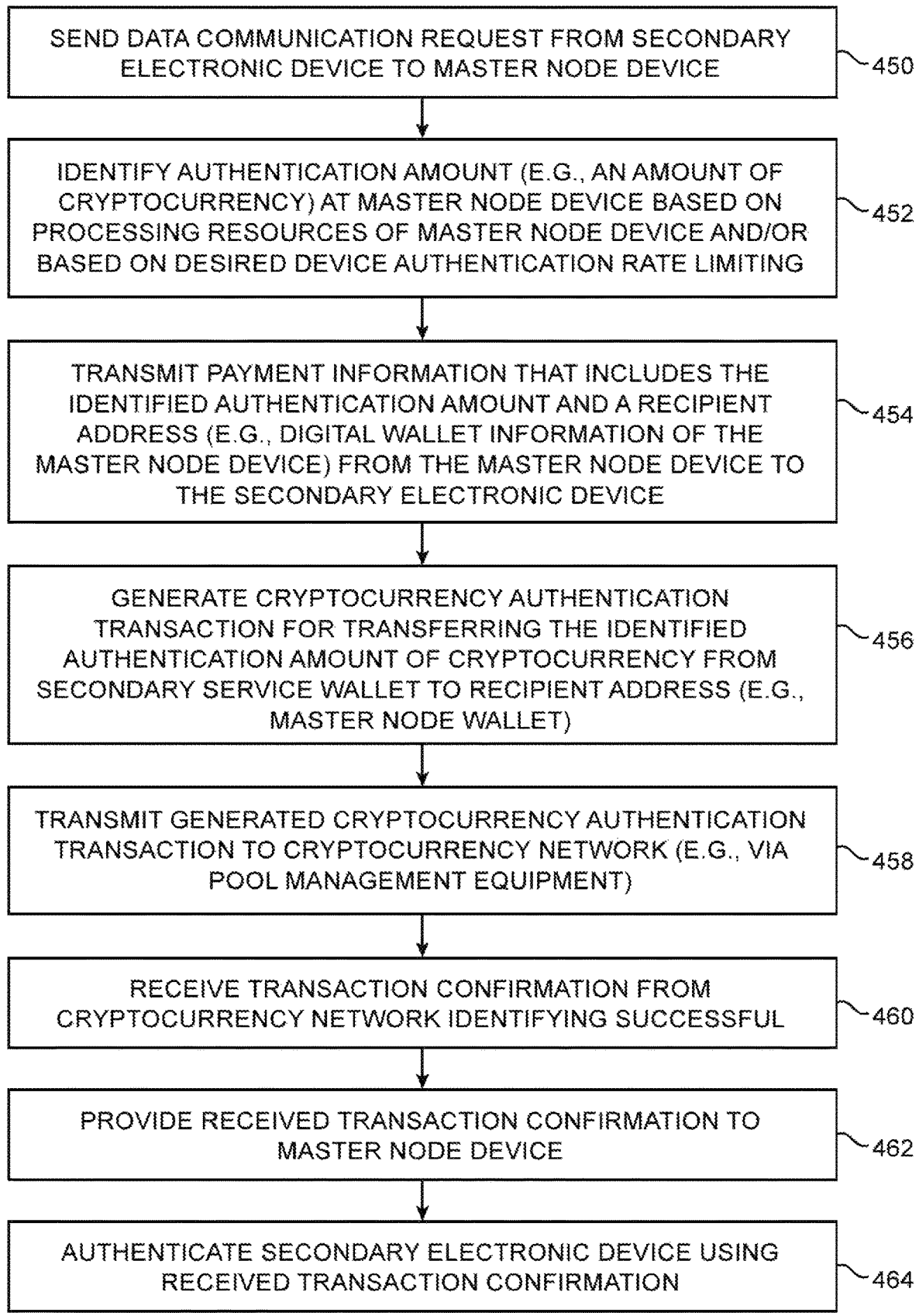
FIG. 18 is a flow chart of illustrative steps that may be performed to authenticate the identity of an electronic device by generating an authentication cryptocurrency transaction in accordance with an embodiment.

FIG. 18 is a flow chart of illustrative steps that may be performed by master node device 300 and secondary device 302 for authenticating device 302 using an authentication cryptocurrency transaction. The authentication transaction may be used solely for the purposes of device authentication (e.g., the authentication transaction may not involve the exchange of cryptocurrency for goods or services). The steps of FIG. 18 may, for example, be performed while processing step 404 of FIG. 14.

At step 450, secondary device 302 may transmit communications request 430 to master node device 300. Request 430 may indicate that secondary device 302 intends to transmit data to master node device 300 and/or access data from device 300.

At step 452, master node device 300 may identify authentication amount AUTHAMT to use for the authentication cryptocurrency transaction. Authentication amount AUTHAMT may be, for example, 1 bitcoin, 2 bitcoins, 0.1 bitcoins, 0.01 bitcoins, 0.0001 bitcoins, etc. Master node device 300 may, if desired, select authentication amount AUTHAMT based on the processing resources of master node device 300 (e.g., device 300 may select a higher authentication amount in scenarios where device 300 has relatively high processing resources whereas device 300 may select a lower authentication amount in scenarios where device 300 has relatively few processing resources). If desired, device 300 may select amount AUTHAMT based on a desired amount of device filtering (e.g., device connection rate limiting) to be performed. For example, device 300 may set amount AUTHAMT to a greater value to make it more difficult for other devices to establish communications with device 300 than when lower values are used. If desired, device 300 may set amount AUTHAMT to zero to effectively disable any device filtering operations. In this way, devices that do not have the processing resources or cryptocurrency to meet amount AUTHAMT may be filtered from connecting to device 300. This may serve, for example, as an anti-spamming measure that protects device 300 against unauthorized devices attempting to hijack device 300 or devices that constantly broadcast data to block the communications abilities of device 300 (e.g., in a Distributed Denial-of-Service attack, etc.).

At step 454, master node device 300 may generate payment information 432 identifying the selected authentication amount. Master node device 300 may include information about wallet 332 or any other predetermined cryptocurrency wallet in payment information 432. For example, master node device 300 may include public key $K_M$PUB in payment information 432. Master node device 300 may transmit payment information 432 to secondary device 302.

At step 456, secondary device 302 may generate cryptocurrency transaction 434 based on received payment information 432. Cryptocurrency transaction 434 may be used solely for authentication of the identity of device 302. For example, transaction 434 may not involve the transfer of value to another organization not associated with devices 300 and 302. Similarly, transaction 434 may not involve the purchase of goods or services. Device 302 may generate authentication transaction 434 having an amount field AUTHAMT, a source address associated with wallet 308 (e.g., a public key of wallet 308), and a destination address as identified by payment information 432 (e.g., public key $K_M$PUB). Device 302 may digitally sign transaction 434 using private key $K_E$PRIV if desired.

At step 458, device 302 may transmit transaction 434 to cryptocurrency network 282 for recording the transaction. Once network 282 has recorded the transaction in the global ledger (e.g., thereby verifying the transaction using the distributed nodes of network 282), network 282 may transmit transaction confirmation 436.

At step 460, device 302 may receive transaction confirmation 436 from cryptocurrency network 282 or from a corresponding mining pool manager device.

At step 462, device 302 may forward transaction confirmation 436 to master node device 300 so that device 300 can verify the identity of device 302.

At step 464, master node device 300 may verify the identity of device 302 using received transaction confirmation 436. For example, device 300 may identify that cryptocurrency in the amount AUTHAMT has been successfully transferred from a wallet known to be associated with device 302 to a predetermined wallet such as the wallet maintained by master node device 300. Identifying that such a transaction has taken place may indicate that cryptocurrency network 282 has successfully verified the identity of secondary device 302. Master node device 300 may subsequently interact with secondary device 302 as a trusted source. For example, device 300 may begin to receive broadcasted data from secondary device 302.

The example in which a single secondary device 302 is attempting communications with master node device 300 is merely illustrative. In general, any desired number of secondary devices 302 may attempt to establish communications with master node device 300. Cryptocurrency authentication transactions may be generated to authenticate the identities of each of the secondary devices 302.

Figure 19:
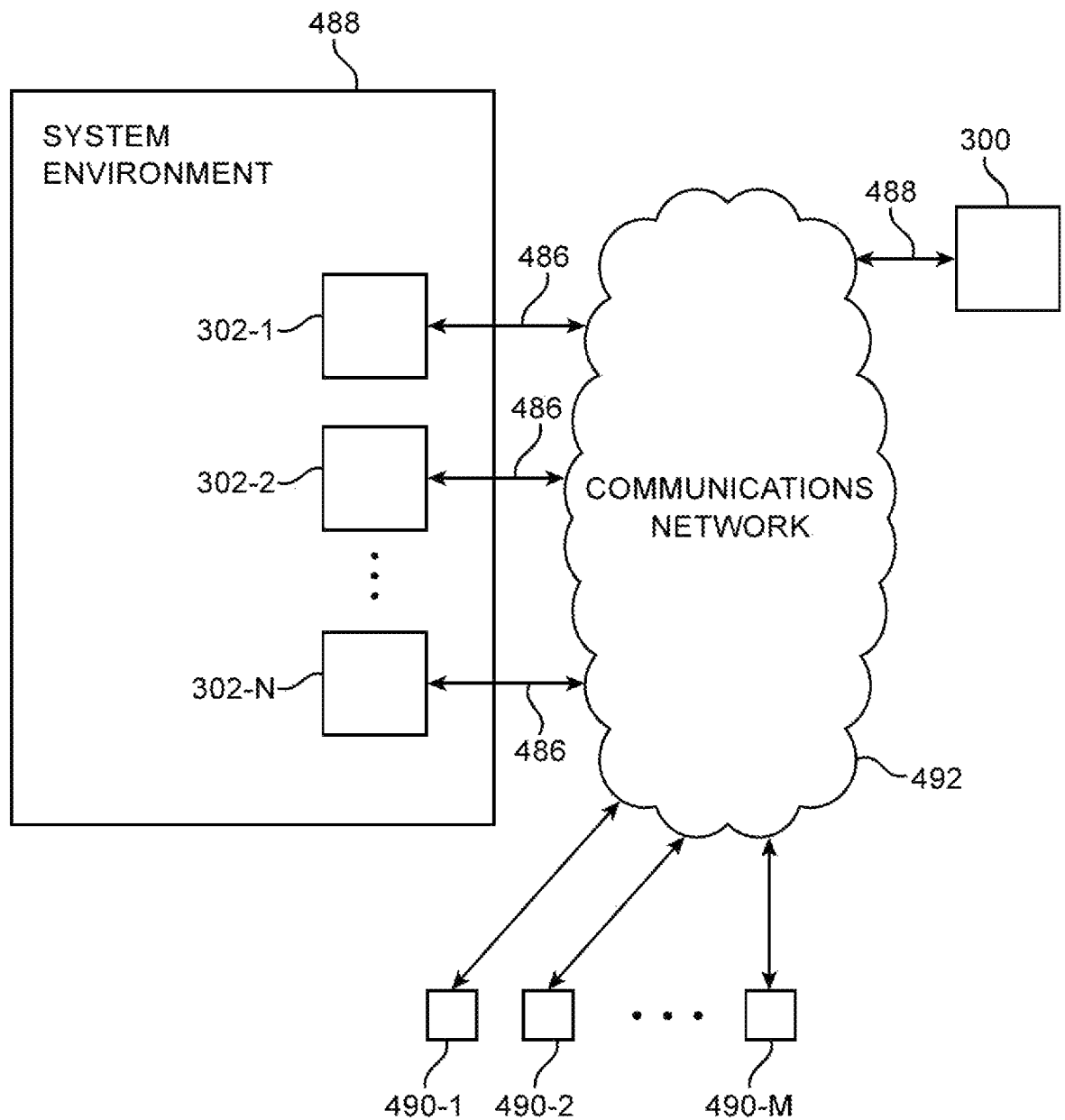
FIG. 19 is an illustrative diagram showing how multiple electronic devices in a system environment may authenticate communications with a master node device by generating respective authentication cryptocurrency transactions in accordance with an embodiment.

FIG. 19 is an illustrative diagram showing how multiple secondary devices 302 may use cryptocurrency transactions to authenticate their identity for master node device 300. As shown in FIG. 19, multiple secondary devices 302 may be formed in a system environment 488 (e.g., a first device 302-1, a second device 302-2, an Nth device 302-N, etc.). System environment 488 may be distributed across different geographic locations or may be formed at a single geographic location.

In one suitable arrangement, system environment 488 is a building, vehicle, house, campus, public park, or other localized system within which each secondary device 302 is located. Devices 302 may, for example, be environmental sensor devices that gather environmental measurements (e.g., temperature measurements, air pressure measurements, weather measurements, etc.) from different points within system environment 488 (e.g., in different rooms of a building, at different points in a park, etc.). In this example, master node device 300 may maintain sensor measurement data gathered by each of secondary nodes 302. Master node device 300 may be formed within system 488 or at a location that is remote from system 488. Master node device 300 may be coupled to communications network 492 via a corresponding communications link 488. Secondary devices 302 may be coupled to communications network 492 via corresponding communications links 486. Communications network 492 may include any desired networks such as cryptocurrency network 282, network 292, pool network 286, or any other desired networks such as the internet.

Secondary devices 302 may wish to periodically establish communication with master node device 300 (e.g., in order transmit gathered measurement data or other data to master node device 300). Devices 302 may request establishment of communication links to master node device 300 via communications paths 486 and 488. Master node 300 may transmit challenge 422 (FIG. 16) or payment information 432 (FIG. 17) to verify the authenticity of each device prior to accepting and recording data transmitted by devices 302. Each secondary device 302 may provide corresponding digitally signed data to master node device 300 in response to receiving challenge 422 or may generate a corresponding authentication transaction 434 in response to receiving payment information 432. Cryptocurrency wallets of each device 302 may include cryptocurrency generated using mining circuitry 116 implemented on each device 302 or cryptocurrency may be preloaded onto the wallets. For example, the operator of devices 302 and 300 (e.g., an organization that owns and/or operates both devices 302 and device 300) may transfer cryptocurrency to the wallets of devices 302 upon initial set up of devices 302 or may periodically replenish cryptocurrency stored on the wallets of devices 302 (e.g., using corresponding cryptocurrency transactions).

The wallet information associated with each device 302 may be known to (e.g., stored at) master node 300. In this way, any authentication transaction generated by secondary devices 302 will involve transfer of cryptocurrency from a known wallet to the wallet of master node device 300. Verification of completion of the authentication transaction by cryptocurrency network 282 may serve to confirm the authenticity of each device 302. In this way, cryptocurrency network 282 may verify the authenticity of each secondary device 302 in system 488 (e.g., using respective authentication transactions). After verifying the authenticity of each device 302, master node 300 may accept and store data transmitted from devices 302.

For example, device 300 may have greater storage capacity than devices 302 and may be used to store server logs or other large data files that would occupy excessive storage space on devices 302. Device 300 may store the large data files after verifying the authenticity of devices 302. In another suitable arrangement, after verifying the authenticity of each device, master node 300 may grant access to stored data to devices 302. For example, node 300 may grant access to stored server logs or other large data files after verifying the authenticity of devices 302.

In practice, other computing nodes that are not associated with system environment 488 may attempt to broadcast data to master node device 300. Such nodes may not be authorized to broadcast data to master node 300. For example, unauthorized nodes 490 (e.g., a first node 490-1, a second node 490-2, an Mth node 490-M, etc.) may attempt to establish communications with master node device 300. However, any cryptocurrency transactions generated by devices 490 will not include authentic (e.g., known) source address information (e.g., cryptographic key information). If desired, master node device 300 may set authentication amount AUTHAMT to a relatively high value such that it becomes excessively expensive or impractical for a large number of devices 490 to attempt to overload device 300 with requests to establish communications. In this way, selection of a desired authentication amount AUTHAMT may serve as an adjustable filter of connecting devices (e.g., a spamming filter) for master node 300.

If desired, secondary devices 302 may generate additional cryptocurrency transactions for purchasing digital services from master node device 300 or from other devices coupled to communications network 492. In another suitable arrangement, devices 302 may periodically generate cryptocurrency transactions to serve as "proof-of-life" signals to master node device 300 (e.g., so that master node device 300 is aware that each device 302 is still operational).

If desired, once a given device 302 has been authenticated, that device may continue to broadcast data to master node device 300 for a predetermined amount of time or indefinitely. In another suitable arrangement, secondary devices 302 may generate an authentication transaction 434 prior to each attempt to broadcast data to device 300. As such a transaction involves a transfer of a predetermined amount of cryptocurrency, it can quickly become expensive for a large number of unauthorized devices 490 to spam master node 300 with broadcasted data, even if each individual authentication transaction involves only a relatively small amount of cryptocurrency. The requirement for authentication using cryptocurrency transactions may thereby discourage spamming of broadcasted data to master node device 300. In yet another suitable arrangement, if desired, master node 300 may generate a cryptocurrency transaction prior to transmitting data to secondary devices 302. For example, master node device 300 may identify real-time weather information and can transmit the real-time weather information to secondary devices 302 after generating a corresponding authentication transaction. Similarly, secondary devices 302 may gather real-time weather information using sensors 316 and may transmit the weather information to master node device 300 after generating corresponding authentication transactions.

By utilizing cryptocurrency transactions for device authentication, devices 300 and 302 may confirm the authenticity of each device prior to establishing communications using the verification capabilities of distributed cryptocurrency network 282. By transferring cryptocurrency to perform device authentication, the devices may increase the difficulty and feasibility with which unauthorized devices are able to establish or attempt to establish communications with the devices. Using cryptocurrency transactions for authentication further allows for such authentication operations to be performed without the use of bank transactions or credit card transactions that can involve burdensome transaction fees. Such authentication transactions may allow for devices such as devices 300 and 302 to efficiently perform authentication in an automated manner without active input from a user. By generating cryptocurrency using mining circuitry 116, device 302 may effectively convert power into authentication credentials for establishing a connection with an external device such as device 300.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of performing device authentication operations using cryptocurrency transactions, the method comprising:

at a secondary node device that includes processing circuitry and embedded cryptographic mining circuitry coupled to the processing circuitry via input-output circuitry, using the processing circuitry to maintain information identifying a first cryptocurrency wallet stored by storage circuitry included in the secondary node device;

using the embedded cryptocurrency mining circuitry, generating mined cryptocurrency by performing a plurality of cryptographic hashing operations;

with the processing circuitry, generating a coinbase transaction for transfer of the mined cryptocurrency to the first cryptocurrency wallet;

with the processing circuitry, transmitting a data broadcast request to a master node device external to the secondary node device and communicatively coupled to the secondary node device via a communications network;

with the master node device, transmitting payment information to the secondary node device, wherein the payment information identifies a second cryptocurrency wallet of the master node and an authentication amount of cryptocurrency;

at the processing circuitry, generating an authentication cryptocurrency transaction that specifies a transaction amount that is equal to the authentication amount, that identifies the first cryptocurrency wallet as a source wallet, and that identifies the second cryptocurrency wallet as a destination wallet, wherein the generating includes signing the authentication cryptocurrency transaction using a private key associated with the first cryptocurrency wallet, wherein the authentication cryptocurrency transaction is a transaction to transfer at least a portion of the mined cryptocurrency from the first cryptocurrency wallet to the second cryptocurrency wallet;

with the processing circuitry, transmitting the authentication cryptocurrency transaction to a cryptocurrency network;

at the master node device, receiving transaction confirmation information from the cryptocurrency network, the confirmation information confirming transfer of the authentication amount from the first cryptocurrency wallet to the second cryptocurrency wallet;

at the master node device, determining, based on the received transaction confirmation information, whether the cryptocurrency network has verified that the secondary node device generated the authentication cryptocurrency transaction; and responsive to determination that the authentication cryptocurrency transaction is verified by the cryptocurrency network as being generated by the secondary node device, the master node device receiving the data from the secondary node device and storing the received data at the master node device in a database separate from the cryptocurrency network;

with the secondary node device, transmitting a request to access the data stored at the master node device;

at the master node device, determining whether one or more sets of past transaction confirmation information associated with the first cryptocurrency wallet have been received from the cryptocurrency network, the transaction confirmation information including verification from the cryptocurrency network that the secondary node device generated one or more past authentication cryptocurrency transactions different from the authentication cryptocurrency transaction; and when determining that the cryptocurrency network has verified that the secondary node device generated the one or more past authentication cryptocurrency transactions, transmitting the stored data from the master node device to the secondary node device.

2. The method defined in claim 1, further comprising:
with environmental sensor circuitry on the secondary node device, gathering sensor data from an environment of the secondary node device, wherein the data comprises the gathered sensor data.

3. The method defined in claim 2, wherein the environmental sensor circuitry comprises circuitry selected from the group consisting of: camera circuitry, light sensor circuitry, temperature sensor circuitry, atmospheric pressure sensor circuitry, humidity sensor circuitry, and motion detection circuitry.

4. The method defined in claim 2, further comprising:
with the master node device, selecting the authentication amount of cryptocurrency to perform a predetermined amount of device connection rate limiting.

5. The method defined in claim 4, further comprising:
responsive to determination that the authentication cryptocurrency transaction is not verified by the cryptocurrency network as being generated by the secondary node device, the master node device blocking the data from being stored at the master node device in the database.

6. The method defined in claim 1, wherein the secondary node device and the master node device are operated by a given organization, and wherein the authentication cryptocurrency transaction involves no transfer of value to additional organizations that are different from the given organization.

7. The method defined in claim 1, wherein the secondary node device has a first storage capacity and the master node device has a second storage capacity that is greater than the first storage capacity, and wherein the data broadcast request comprises a request to broadcast data files for storage at the master node device.

8. The method defined in claim 1, further comprising:
at the master node device, distributing the transaction confirmation information from the cryptocurrency network to one or more additional devices different from the secondary node device and the master node device, the transaction confirmation information including verification from the cryptocurrency network that the secondary node device generated the authentication cryptocurrency transaction.

9. The method defined in claim 1, wherein the embedded mining circuitry includes mining control circuitry communicatively coupled to each of a plurality of core circuits, each core circuit including circuits for performing cryptographic hashing on inputs provided by the control circuitry.

10. The method defined in claim 1, wherein responsive to determination that the authentication cryptocurrency transaction is verified by the cryptocurrency network as being generated by the secondary node device, the cryptocurrency network records the authentication cryptocurrency transaction in a global ledger to transfer the authentication amount from the first cryptocurrency wallet to the second cryptocurrency wallet.

11. The method defined in claim 1, wherein the secondary node device automatically generates the authentication cryptocurrency transaction in response to receiving the payment information from the master node.

\* \* \* \* \*